(12) United States Patent
Kodama et al.

(10) Patent No.: US 10,622,144 B2
(45) Date of Patent: Apr. 14, 2020

(54) METHOD FOR PRODUCING ELECTRICALLY CONDUCTIVE MEMBERS

(71) Applicant: NISSIN KOGYO CO., LTD., Nagano-ken (JP)

(72) Inventors: Takuro Kodama, Nagano (JP); Keiichi Tatsuno, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 125 days.

(21) Appl. No.: 15/370,703

(22) Filed: Dec. 6, 2016

(65) Prior Publication Data

US 2017/0084391 A1 Mar. 23, 2017

Related U.S. Application Data

(62) Division of application No. 13/095,575, filed on Apr. 27, 2011, now Pat. No. 9,545,902.

(30) Foreign Application Priority Data

Apr. 28, 2010 (JP) .................................. 2010-104126
Nov. 9, 2010 (JP) .................................. 2010-251193

(Continued)

(51) Int. Cl.
*H01F 41/10* (2006.01)
*H01F 27/29* (2006.01)
(Continued)

(52) U.S. Cl.
CPC ............ *H01F 41/10* (2013.01); *B60T 8/3675* (2013.01); *H01F 5/04* (2013.01); *H01F 27/29* (2013.01);
(Continued)

(58) Field of Classification Search
CPC ........ H01F 41/02; H01F 41/10; H01F 27/325; H01F 5/04; H01F 27/29; H01F 27/292;
(Continued)

(56) References Cited

U.S. PATENT DOCUMENTS

| 3,660,791 A | 5/1972 | Davis |
| 4,003,128 A | 1/1977 | Dochterman |

(Continued)

FOREIGN PATENT DOCUMENTS

| DE | 19545011 A1 | 4/1997 |
| JP | 01226129 A * | 9/1989 |

(Continued)

OTHER PUBLICATIONS

Machine Translation (in English) of Japanese Patent Publication, JP 5-315176, Jun. 2018.*

(Continued)

*Primary Examiner* — A. Dexter Tugbang
(74) *Attorney, Agent, or Firm* — Andrew M. Calderon; Roberts Calderon Safran & Cole, P.C.

(57) ABSTRACT

A method for producing a pair of electrically conductive members assembled into an electrical component assembly provided with a coil. The method includes: forming connection terminal sections provided in the pair of electrically conductive members by arranging them alternately opposite to each other and then performing press punching; and after the press punching, bending the connection terminal sections in the pair of electrically conductive members toward a side departing from the coil into a protruding form.

13 Claims, 12 Drawing Sheets

(30) Foreign Application Priority Data

Nov. 9, 2010 (JP) ................................ 2010-251194
Nov. 9, 2010 (JP) ................................ 2010-251195

(51) Int. Cl.

| | | |
|---|---|---|
| *H01R 43/16* | (2006.01) | |
| *H01F 5/04* | (2006.01) | |
| *H01F 41/02* | (2006.01) | |
| *H01F 41/076* | (2016.01) | |
| *B60T 8/36* | (2006.01) | |
| *H01F 27/32* | (2006.01) | |
| *H01R 43/24* | (2006.01) | |
| *B29C 45/14* | (2006.01) | |
| *B29L 31/34* | (2006.01) | |

(52) U.S. Cl.
CPC ......... *H01F 27/292* (2013.01); *H01F 27/325* (2013.01); *H01F 41/02* (2013.01); *H01F 41/024* (2013.01); *H01F 41/076* (2016.01); *H01R 43/16* (2013.01); *H01R 43/24* (2013.01); *B29C 45/14639* (2013.01); *B29L 2031/34* (2013.01); *Y10T 29/49002* (2015.01); *Y10T 29/49073* (2015.01); *Y10T 29/49121* (2015.01); *Y10T 137/7837* (2015.04)

(58) Field of Classification Search
CPC ..... H01F 41/076; H01F 41/024; H01R 43/16; H01R 43/24; B60T 8/3675; B29C 45/14639; B29L 2031/34; Y10T 137/7837; Y10T 29/49002; Y10T 29/49073; Y10T 29/49121
See application file for complete search history.

(56) References Cited

U.S. PATENT DOCUMENTS

| | | | |
|---|---|---|---|
| 4,646,047 A | 2/1987 | Horn et al. | |
| 4,683,454 A | 7/1987 | Vollmer et al. | |
| 4,728,916 A | 3/1988 | Fontecchio et al. | |
| 4,879,804 A * | 11/1989 | Chiang ............. | Y10T 29/49121 29/602.1 |
| 4,908,593 A | 3/1990 | Takayangai | |
| 5,449,226 A | 9/1995 | Fujita et al. | |
| 5,482,362 A | 1/1996 | Robinson | |
| 5,513,905 A | 5/1996 | Zeides et al. | |
| 5,762,318 A | 6/1998 | Staib et al. | |
| 5,887,624 A | 3/1999 | Taniguchi et al. | |
| 6,120,114 A | 9/2000 | Blazic et al. | |
| 6,124,772 A | 9/2000 | Heise | |
| 6,352,317 B1 | 3/2002 | Blazic et al. | |
| 6,407,654 B1 * | 6/2002 | Saito ..................... | H01F 41/024 335/80 |
| 8,246,121 B2 | 8/2012 | Homann et al. | |
| 2003/0088968 A1 * | 5/2003 | Noda ................. | Y10T 29/49121 29/601 |
| 2004/0119575 A1 | 6/2004 | Steiner | |
| 2005/0225418 A1 | 10/2005 | Tran-Ngoc et al. | |

FOREIGN PATENT DOCUMENTS

| | | | |
|---|---|---|---|
| JP | 02066903 A | * | 3/1990 |
| JP | 05315176 A | * | 11/1993 |
| JP | 9511964 A | | 12/1997 |
| JP | 10059151 A | | 3/1998 |
| JP | 11321610 A | | 11/1999 |
| JP | 2000255415 A | | 9/2000 |
| JP | 2002075737 A | * | 3/2002 |
| JP | 2003154929 A | | 5/2003 |
| JP | 2003175812 A | | 6/2003 |
| JP | 2007022222 A | | 2/2007 |
| JP | 2007153305 A | | 6/2007 |
| JP | 2008105643 A | | 5/2008 |
| JP | 2009030801 A | | 2/2009 |
| WO | WO-9807603 | | 2/1998 |
| WO | WO-9849039 | | 11/1998 |

OTHER PUBLICATIONS

Machine Translation (in English) of Japanese Patent Publication, JP 1-226129, Jun. 2018.*
Machine Translation (English) of Japanese Patent Publication, JP 2002-75737, Dec. 2018.*
Machine Language Translation of Japanese Patent Publication, JP 2-66903, Apr. 2019.*
Extended European Search Report for Application No. 11164068.6 dated Jun. 25, 2012.
Japanese Patent Office Action for Application 2010-251193, dated Oct. 4, 2012, 6 pages with translation.
Japanese Patent Office Action for Application 2010-251194, dated Oct. 17, 2012, 7 pages with translation.

* cited by examiner

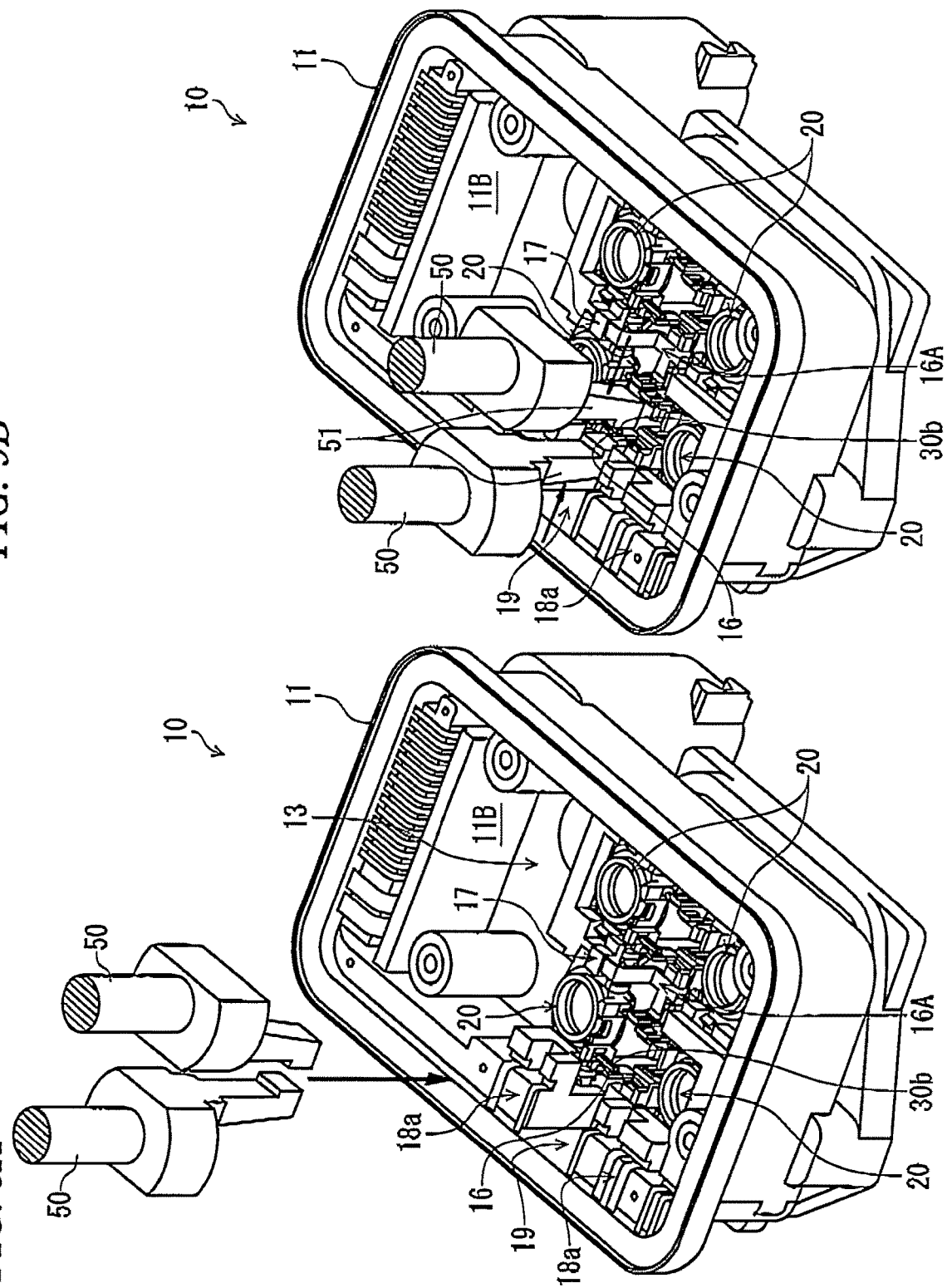

US 10,622,144 B2

METHOD FOR PRODUCING ELECTRICALLY CONDUCTIVE MEMBERS

CROSS REFERENCE TO RELATED APPLICATION(S)

The present disclosure relates to the subject matters contained in Japanese Patent Application No. 2010-251195 filed on Nov. 9, 2010, Japanese Patent Application No. 2010-104126 filed on Apr. 28, 2010, Japanese Patent Application No. 2010-251193 filed on Nov. 9, 2010, and Japanese Patent Application No. 2010-251194 filed on Nov. 9, 2010, which are incorporated herein by reference in its entirety.

BACKGROUND

1. Field

The present invention relates to a connection structure for electrical component assembly, a hydraulic pressure control apparatus, and a method for producing electrically conductive member.

2. Description of the Related Art

In a vehicle brake hydraulic pressure control apparatus serving as an example of a hydraulic pressure control apparatus, a connection structure of electrically connecting an electrical component assembly to a housing mounted on a base is known, for example, as disclosed in JP-A-2007-153305 and JP-A-2003-175812.

JP-A-2007-153305 and JP-A-2003-175812 disclose connection structures in which connection terminal sections of electrically conductive members provided in an electrical component assembly provided with a coil rise along the axis direction of the coil, and then are fixed by welding to housing-side connection terminals provided on the housing side.

Here, the electrically conductive members are manufactured by press punching from a metal plate or the like.

Nevertheless, in the configurations disclosed in JP-A-2007-153305 and JP-A-2003-175812, since the connection terminal sections of the electrically conductive members provided in the electrical component assembly rise along the axis direction of the coil, a space need be ensured in the direction of rise. Thus, size increase may be caused in a vehicle brake hydraulic pressure control apparatus serving as an assembled apparatus on which a apparatus having this configuration is mounted.

Further, since the electrically conductive members rise along the axis direction of the coil, at the time of manufacturing of the electrically conductive members from a metal plate or the like by press punching, the punching need be performed in a larger size by the length of the rise. This may cause a larger loss in the material so as to degrade a so-called production yield, and thereby may cause difficulty in improvement of the manufacturing efficiency.

In a vehicle brake hydraulic pressure control apparatus serving as an example of a hydraulic pressure control apparatus, a connection structure of electrically connecting an electrical component assembly to a housing mounted on a base is known, for example, as disclosed in JP-A-2003-175812.

JP-A-2003-175812 discloses a connection structure in which connection terminal sections of electrically conductive members provided in an electrical component assembly provided with a coil are electrically connected by welding to housing-side connection terminals of a bus bar connected by wire bonding.

The welding between the connection terminal sections of the electrically conductive members and the housing-side connection terminals has been performed, after the electrical component assembly is assembled in the housing, by inserting the tip part of the electrical connection jig from the opening side and then pinching them with the tip part of the electrical connection jig.

Nevertheless, in the technique disclosed in JP-A-2003-175812, a certain space used for insertion of the tip part of the electrical connection jig need be ensured in the housing. This may cause size increase in the housing or in a hydraulic pressure control apparatus to which the housing is assembled.

A configuration of a hydraulic pressure control apparatus used in a vehicle is disclosed, for example, in which a housing has an intermediate wall that separates an accommodation chamber for accommodating a circuit board from an accommodation chamber for accommodating an electrical component assembly such as a coil device (see JP-A-2003-175812, for instance).

In this hydraulic pressure control apparatus, a hole corresponding to the electrical component assembly is formed in the intermediate wall. Then, the electrical component assembly is mounted through this hole.

In the hydraulic pressure control apparatus described in JP-A-2003-175812, although a hole is formed in the intermediate wall, the entire circumference of the electrical component assembly is enclosed by the intermediate wall. Thus, the intermediate wall occupies a large space, and hence a large amount of resin material need be used for molding of the intermediate wall. This may cause cost increase and weight increase in the housing.

SUMMARY

A first object of the present invention is to provide a connection structure for electrical component assembly, a hydraulic pressure control apparatus, and a method for producing electrically conductive member in which size reduction of an assembled apparatus is achieved and the production yield is improved so that the manufacturing efficiency is improved.

With the first object in mind, there is provided a connection structure for electrical component assembly including an electrical component assembly provided with a coil energized through a pair of electrically conductive members; and a housing that covers the electrical component assembly and that is provided with housing-side connection terminals, wherein each of the electrically conductive members has a connection terminal section connectable to the housing-side connection terminal, wherein the connection terminal section is bent toward a side departing from the coil so as to protrude toward a side of the electrical component assembly, and one of the connection terminal sections is arranged at a position deviated in an axis direction of the coil relative to the other of the connection terminal sections.

According to this connection structure for electrical component assembly, the connection terminal sections of the pair of electrically conductive members are bent toward a side departing from the coil so as to protrude toward the electrical component assembly, and one connection terminal section is arranged at a position deviated in an axis direction of the coil relative to the other connection terminal section. Thus, in comparison with a case that the connection terminal sections of the electrically conductive members rise along the axis direction of the coil like in the related art, the size is reduced in the axis direction of the electrical component assembly which is equal to the axis direction of the coil. Thus, size reduction is achieved in a housing into which an electrical component assembly is assembled and in an assembled apparatus to which this housing is assembled like a vehicle brake hydraulic pressure control apparatus.

Further, at the time of forming the electrically conductive members from a metal plate or the like by press punching, the electrically conductive members are formed by press punching by using a layout that the connection terminal sections of the electrically conductive members are located alternately opposite to each other on the metal plate. This minimizes unnecessary parts after the press punching. Thus, in comparison with the related art, a loss in the material is reduced and the production yield is improved. This realizes cost reduction and improves the manufacturing efficiency.

Further, in the connection structure for electrical component assembly, the housing may have an intermediate wall extending in a direction parallel to a protruding direction of the connection terminal sections and a part of the housing-side connection terminals may be embedded in this intermediate wall, and that the electrically conductive members may be electrically connected to the housing-side connection terminals in a crossed state.

According to this connection structure for electrical component assembly, the connection terminal sections of the electrically conductive members are electrically connected in a crossing state to the housing-side connection terminals of the intermediate wall extending in a direction parallel to the protruding direction of the connection terminal sections. Thus, the housing-side connection terminals are arranged on the housing-side in a space-saving manner. Further, the electrically conductive members protrude toward the housing-side is controlled. This permits size reduction of an assembled apparatus such as a vehicle brake hydraulic pressure control apparatus on which the electrical component assembly is mounted.

Further, in the housing, components such as a control board are allowed to be arranged close to the electrical component assembly. This increases flexibility in the design.

Further, in the connection structure for electrical component assembly, the electrical component assembly may include a bobbin around which the coil is wound, and wherein the bobbin may be provided with a terminal supporting section for supporting the bent portions of the connection terminal sections with the bent portions included in the terminal supporting section.

According to this connection structure for electrical component assembly, the terminal supporting section is formed in such a manner that the bent portions of the connection terminal sections are included inside the bobbin. Thus, in a state that the strength of the bent portions is improved, the connection terminal sections are formed integrally with the bobbin.

Further, in the connection structure for electrical component assembly, in the housing, a wire bonding section electrically connected by wire bonding to electrical components accommodated in the housing may be provided at a position near the electrical component assembly, and in the wire bonding section, a portion opposite to a connection part between the electrically conductive members and the housing-side connection terminals may be provided with a gap that permits accommodation and movement of a tip part of an electrical connection jig used for electrical connection of these.

According to this connection structure for electrical component assembly, in the wire bonding section provided at a position near the electrical component assembly in the housing, the portion opposite to the connection part between the electrically conductive members and the housing-side connection terminals in the electrical component assembly is provided with a gap that permits insertion and movement of the tip part of the electrical connection jig used for electrical connection of these. Thus, the tip part of the electrical connection jig can be inserted through this gap so that the tip part of the electrical connection jig can appropriately be arranged on a side of the connection part between the electrically conductive members and the housing-side connection terminals. Then, the tip part of the electrical connection jig can be moved within the gap so that electrical connection work can be performed appropriately.

Thus, in a state that a certain space used for insertion and movement of the tip part of the electrical connection jig is ensured in the housing, size reduction of the housing is achieved.

Further, at the time of electrical connection, when the tip part of the electrical connection jig is inserted toward the gap, the tip part of the electrical connection jig can easily be arranged on a side of the connection part between the electrically conductive members and the housing-side connection terminals. This improves workability in the electrical connection work.

Further, the wire bonding section can be arranged close to the electrical component assembly. This improves cabling easiness of the electrically conductive materials and flexibility in the design of the housing.

Further, the connection structure for electrical component assembly may further comprise a plurality of electrical component assemblies, the housing may cover the plurality of the electrical component assemblies, the plurality of electrical component assemblies may be arranged in two rows, and in each row, pairs of the electrically conductive members of two of the electrical component assemblies may face each other.

According to this connection structure for electrical component assembly, welding locations between the electrically conductive members and the housing-side connection terminals are collected into a part between two electrical component assemblies in each row. Thus, even in a connection structure having a plurality of electrical component assemblies, the cycle time can be reduced in the electrical connection work. This improves productivity.

Further, in the connection structure for electrical component assembly, the housing may have an intermediate wall for dividing a space in the housing into two, and that the intermediate wall may have: an opening having an approximately quadrangular shape and capable of accommodating a plurality of the electrical component assemblies; an extension section extending from an edge of the opening to the opening; and a holding section that is provided in the extension section and against which an end of the electrical component assembly abuts so as to be positioned.

According to this connection structure for electrical component assembly, the intermediate wall of the housing is provided with the opening having an approximately quadrangular shape and capable of accommodating a plurality of electrical component assemblies. Further, the extension section extending in the opening from the edge of the opening is provided with the holding section against which the end of the electrical component assembly abuts so that positioning is achieved. Thus, a plurality of electrical component assemblies can be arranged into the opening in such a way that the end of each electrical component assembly abuts against the holding section so that positioning is achieved.

Further, the large opening is provided that is capable of accommodating a plurality of electrical component assemblies. Thus, the amount of material such as resin material used in the intermediate wall can be reduced as much as possible. Thus, weight reduction of the housing is achieved.

Further, in the configuration that the extension section bridges the mutually opposing edges of the opening, the electrical component assembly can abut compactly and effectively with desired strength.

Further, in the connection structure for electrical component assembly, the electrical component assembly may have an end piece protruding and formed in the end, and is the holding section may be provided with a notch with which the end piece is engaged.

According to this connection structure for electrical component assembly, when the electrical component assembly is to be arranged into the opening, the end piece of the electrical component assembly is engaged with the notch provided in the holding section so that the electrical component assembly is positioned to the opening. Thus, positioning of the electrical component assembly is achieved easily, and so is the assembling work. This contributes to improvement of productivity.

Further, in the connection structure for electrical component assembly, the extension section may have a reinforcement rib protruding in an axis direction of the electrical component assembly.

According to this connection structure for electrical component assembly, the reinforcement rib is provided in the extension section. Thus, in spite of the structure that the extension section bridges over the opening, its strength is ensured so that the extension section can appropriately position and hold the electrical component assembly. Further, the reinforcement rib protrudes in the axis direction of the electrical component assembly and hence can be arranged, for example, by using a space formed between adjacent electrical component assemblies. This realizes space-saving.

Further, in the connection structure for electrical component assembly, in the extension section, the housing-side connection terminals may be formed by insert molding.

According to this connection structure for electrical component assembly, in a state that the electrical component assembly is positioned, the housing-side connection terminals can be arranged near the connection terminals of the electrical component assembly. Thus, a connection structure for electrical component assembly is obtained in which space-saving is achieved and electric connection is easily performed between the housing-side connection terminals and the connection terminals of the electrical component assembly.

Further, in the connection structure for electrical component assembly, in the extension section, the housing-side connection terminals may be inserted in a middle part in the extension direction.

According to this connection structure for electrical component assembly, the amount of use of resin material is reduced as much as possible by the amount corresponding to the presence of the housing-side connection terminals. Thus, weight reduction of the housing is achieved.

Further, the hydraulic pressure control apparatus according to the present invention has: a base; a solenoid valve arranged on one face of the base; the electrical component assembly mounted on the solenoid valve; and a housing that is mounted on the one face of the base and that accommodates the electrical component assembly and a control unit.

According to this hydraulic pressure control apparatus, in a state that a certain space used for insertion of the tip part of the electrical connection jig is ensured in the housing, size reduction is achieved.

Further, the method for producing electrically conductive member according to the present invention is a method for producing a pair of electrically conductive members assembled into an electrical component assembly provided with a coil, wherein the pair of electrically conductive members are manufactured by: forming connection terminal sections provided in the pair of electrically conductive members by arranging them alternately opposite to each other and then performing press punching; and after the press punching, bending the connection terminal sections in the pair of electrically conductive members toward a side departing from the coil into a protruding form.

According to this method for producing electrically conductive member, the layout on the metal plate is such that the connection terminal sections of the electrically conductive members are located alternately opposite to each other. This minimizes unnecessary parts after the press punching. Thus, in comparison with the conventional art, a loss in the material is reduced and the production yield is improved. This realizes cost reduction and improves the manufacturing efficiency.

Further, in the electrical component assembly having a pair of electrically conductive members produced as described here, in comparison with a case that the electrically conductive members rise along the axis direction of the coil like in the conventional art, the size is reduced in the axis direction of the electrical component assembly which is equal to the axis direction of the coil. Thus, size reduction is achieved in a housing into which an electrical component assembly is assembled and in an assembled apparatus to which this housing is assembled like a vehicle brake hydraulic pressure control apparatus.

Further, the method for producing electrically conductive member may include, after the bending into a protruding form, as a resin molding step, including by insert molding the bent portion of the connection terminal sections into the terminal supporting section provided in a bobbin around which the coil is wound. Then, by virtue of the resin molding step, the connection terminal sections are formed integrally with the bobbin.

According to this method for producing electrically conductive member, by virtue of the resin molding step, the connection terminal sections are formed integrally with the bobbin in a manner that the bent portions of the connection terminal sections are in a state of inclusion. Thus, in a state that the strength of the bent portions is improved, the connection terminal sections are provided integrally with the bobbin. Thus, the bobbin with which the connection terminal sections are formed integrally can be formed efficiently.

According to a first aspect of the present invention, size reduction is achieved in an assembled apparatus on which the electrical component assembly is mounted. Further, the production yield is improved so that the manufacturing efficiency is improved.

A second object of the present invention is to provide a connection structure for electrical component assembly and a hydraulic pressure control apparatus in which in a state that a certain space used for insertion of the tip part of the electrical connection jig is ensured in the housing, size reduction is achieved.

With the second object in mind, there is provided a connection structure for electrical component including an electrical component assembly provided with a coil energized through a pair of electrically conductive members and with a housing that accommodates the electrical component assembly and electrical components, wherein in the housing, provided are: a wire bonding section that is provided at a position near the electrical component assembly and that is electrically connected to the electrical components by wire bonding; and housing-side connection terminals electrically connected to the pair of electrically conductive members, and in the wire bonding section, a portion opposite to a connection part between the electrically conductive members and the housing-side connection terminals is provided with a gap that permits insertion and movement of a tip part of an electrical connection jig used for electrical connection of these.

According to this connection structure for electrical component assembly, in the wire bonding section provided at a position near the electrical component assembly in the housing, the portion opposite to the connection part between the electrically conductive members and the housing-side connection terminals in the electrical component assembly is provided with a gap that permits insertion and movement of the tip part of the electrical connection jig used for electrical connection of these. Thus, the tip part of the electrical connection jig can be inserted through this gap so that the tip part of the electrical connection jig can appropriately be arranged on a side of the connection part between the electrically conductive members and the housing-side connection terminals. Then, the tip part of the electrical connection jig can be moved within the gap so that electrical connection work can be performed appropriately.

Thus, in a state that a certain space used for insertion and movement of the tip part of the electrical connection jig is ensured in the housing, size reduction of the housing is achieved.

Further, at the time of electrical connection, when the tip part of the electrical connection jig is inserted toward the gap, the tip part of the electrical connection jig can easily be arranged on a side of the connection part between the electrically conductive members and the housing-side connection terminals. This improves workability in the electrical connection work.

Further, the wire bonding section can be arranged close to the electrical component assembly. This improves cabling easiness of the electrically conductive materials and flexibility in the design of the housing.

Further, in the connection structure for electrical component assembly, a plurality of the electrical component assemblies may be accommodated in the housing, wherein, in adjacent ones of the electrical component assemblies, the pairs of electrically conductive members may extend in a direction of facing each other and may be arranged opposing to each other and may be respectively connected to the housing-side connection terminals arranged in a direction perpendicular to the direction of facing each other, and that the gap may be located in the perpendicular direction.

According to this connection structure for electrical component assembly, the locations of welding between the electrically conductive members and the housing-side connection terminals are collected into one. Further, at the time of electrical connection, one gap can be used as a shared workspace for plurality of electrical component assemblies.

Thus, it is sufficient that gaps are provided in a minimal number, and hence an increase is obtained in the space efficiency. This permits size reduction of the housing.

Further, in the connection structure for electrical component assembly, the plurality of electrical component assemblies may be arranged in two rows in the housing, and in each row, pairs of the electrically conductive members of two of the electrical component assemblies may face each other.

According to this connection structure for electrical component assembly, the locations of welding between the electrically conductive members and the housing-side connection terminals can be collected into a location between the electrical component assemblies. Thus, even in a connection structure having a plurality of electrical component assemblies, the cycle time can be reduced in the electrical connection work. This improves productivity.

Further, in the connection structure for electrical component assembly, the electrical component assembly may be an electrical component assembly to be mounted on a vehicle, and that the electrical component assembly may be accommodated in the housing in such a manner that at the time of mounting on a vehicle, the pair of electrically conductive members are arranged in parallel with spacing in a direction equal to a vertical direction of the vehicle.

According to this connection structure for electrical component assembly, at the time of mounting on a vehicle, the pair of electrically conductive members are arranged in parallel with spacing in a direction equal to the vertical direction of the vehicle. Thus, the electrical component assembly has resistance against vibrations in the vertical direction of the vehicle.

The hydraulic pressure control apparatus according to the present invention includes: a base; a solenoid valve arranged on one face of the base; the electrical component assembly mounted on the solenoid valve; and the housing that is mounted on the one face of the base and that accommodates a control unit including the electrical component assembly and the electrical components.

According to this hydraulic pressure control apparatus, in a state that a certain space used for insertion of the tip part of the electrical connection jig is ensured in the housing, size reduction is achieved.

According to a second aspect of the present invention, a connection structure for electrical component assembly and a hydraulic pressure control apparatus are obtained in which in a state that a certain space used for insertion of the tip part of the electrical connection jig is ensured in the housing, size reduction is achieved.

A third object of the present invention is to provide a hydraulic pressure control apparatus including a housing provided with an intermediate wall in which weight reduction of the housing is achieved so that the amount of use of resin material in the intermediate wall is reduced as much as possible.

With the third object in mind, there is provided a hydraulic pressure control apparatus including: a base; a solenoid valve arranged on one face of the base; an electrical component assembly mounted on the solenoid valve; and a housing that is mounted on the one face of the base and that accommodates the electrical component assembly and a control unit, wherein the housing includes an intermediate wall for dividing an inner space thereof into two, and wherein the intermediate wall includes: an opening having an approximately quadrangular shape and capable of accommodating a plurality of the electrical component assemblies; an extension section extending such as to bridge mutually opposing edges of the opening; and a holding section that is provided in the extension section and against which an end of the electrical component assembly abuts so as to be positioned.

According to this hydraulic pressure control apparatus, the intermediate wall of the housing is provided with the opening having an approximately quadrangular shape and capable of accommodating a plurality of electrical component assemblies. Further, the extension section extending over the mutually opposing edges of the opening is provided with the holding section against which the end of the electrical component assembly abuts so that positioning is achieved. Thus, a plurality of electrical component assemblies can be arranged into the opening in such a way that the end of each electrical component assembly abuts against the holding section so that positioning is achieved.

Further, the large opening is provided that is capable of accommodating a plurality of electrical component assemblies. Thus, the amount of material such as resin material used in the intermediate wall can be reduced as much as possible. Thus, weight reduction of the housing is achieved.

Further, in the hydraulic pressure control apparatus, the electrical component assembly may have an end piece protruding and formed in the end, and the holding section is provided with a notch with which the end piece is engaged.

According to this hydraulic pressure control apparatus, when the electrical component assembly is to be arranged into the opening, the end piece of the electrical component assembly is engaged with the notch provided in the holding section so that the electrical component assembly can easily and reliably be positioned into the opening. Thus, positioning of the electrical component assembly is achieved easily, and so is the assembling work. This contributes to improvement of productivity.

Further, in the hydraulic pressure control apparatus, the extension section may have a reinforcement rib protruding in an axis direction of the electrical component assembly.

According to this hydraulic pressure control apparatus, the reinforcement ribs are provided in the extension section. Thus, in spite of the structure that the extension section bridges over the opening, its strength is ensured so that the extension section can appropriately position and hold the electrical component assembly. Further, the reinforcement ribs protrude in the axis direction of the electrical component assembly and hence can be arranged, for example, by using a space formed between adjacent electrical component assemblies. This realizes space-saving.

Further, the present invention is characterized in that the edge of the opening opposite to the holding section is provided with an edge-side holding section against which the other end of the electrical component assembly abuts so that positioning is achieved.

According to this hydraulic pressure control apparatus, the electrical component assembly is positioned and held at least at two locations consisting of the holding section and the edge-side holding section of the extension section. Thus, positioning of the electrical component to assembly is easily achieved. Further, more stable holding of the electrical component assembly is achieved by necessary minimum use of resin material.

Further, in the extension section, insert molding of the housing-side connection terminals on the housing side may be performed. According to this configuration, in a state that the electrical component assembly is positioned, the housing-side connection terminals can be arranged near the connection terminals of the electrical component assembly. Thus, a connection structure for electrical component assembly is obtained in which space-saving is achieved and electric connection is easily performed between the housing-side connection terminals and the connection terminals of the electrical component assembly.

Further, in the extension section, the housing-side connection terminals may be inserted in a middle part in the extension direction. According to this configuration, the amount of use of resin material is reduced as much as possible by the amount corresponding to the presence of the housing-side connection terminals. Thus, weight reduction of the housing is achieved.

According to a third aspect of the present invention, a hydraulic pressure control apparatus is obtained which includes a housing provided with an intermediate wall and in which weight reduction of the housing is achieved so that the amount of use of resin material in the intermediate wall is reduced as much as possible.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

FIG. 2A is a perspective view in a state that an electrical component assembly is mounted. FIG. 2B is a perspective view in a state before an electrical component assembly is mounted.

FIG. 4A is a front view in a state that an electrical to component assembly is mounted. FIG. 4B is a front view in a state before an electrical component assembly is mounted.

FIG. 5A is a sectional view taken along line Va-Va in FIG. 4A. FIG. 5B is a sectional view taken along line Vb-Vb in FIG. 4A (shown in a state that the forward and rearward directions are in conformity with those of FIG. 5A).

FIG. 6A is a perspective view viewed from one side of the electrically conductive member. FIG. 6B is a perspective view viewed from the opposite side of the electrically conductive member.

FIG. 7A is a plan view. FIG. 7B is a side view. FIG. 7C is a front view. FIG. 7D is a rear view.

FIGS. 9A and 9B are explanation views showing a step of electrical connection between the electrically conductive members and the housing-side connection terminals.

FIG. 11A is a view of a housing viewed obliquely from front below. FIG. 11B is a sectional view taken along line XIb-XIb in FIG. 11A.

DETAILED DESCRIPTION OF THE EMBODIMENT(S)

The mode of implementing the present invention is described below in detail with reference to the accompanying drawings. Here, in the description, like components are designated by like numerals, and hence duplicated description is omitted.

First Embodiment

Figure 1:
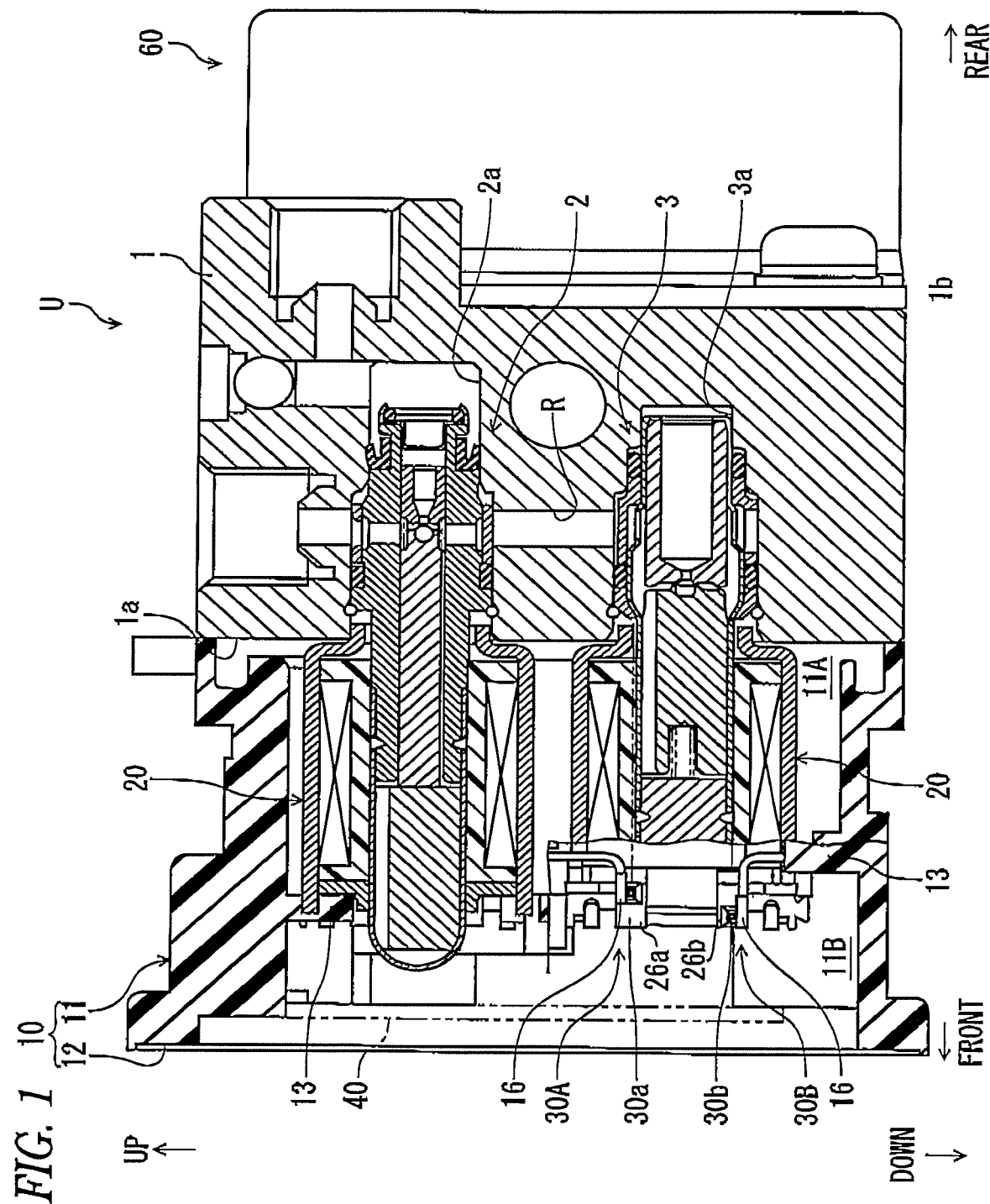
FIG. 1 is a sectional view showing a vehicle brake hydraulic pressure control apparatus serving as an example of a hydraulic pressure control apparatus to which a connection structure for electrical component assembly according to a first embodiment of the present invention is applied.

As shown in FIG. 1, a vehicle brake hydraulic pressure control apparatus (referred to as a "brake control apparatus", hereinafter) U serving as an example of a hydraulic pressure control apparatus on which an electrical component assembly 20 according to the present embodiment is mounted is used suitably in a vehicle such as a motorcycle, a motor tricycle, an all terrain vehicle (ATV), and an automobile so as to control appropriately a damping force (a brake fluid pressure) applied on the wheels of the vehicle. The following description is given for an example that the brake control apparatus U is applied to a motorcycle. However, the type of a vehicle on which the brake control apparatus U is mounted is not limited to this.

The brake control apparatus U has: a base 1; solenoid valves 2 and 3 arranged on one face 1a of the base 1; an electrical component assembly 20 mounted on the solenoid valves 2 and 3; a housing 10 mounted on the one face 1a of the base 1; and a control unit (electrical component) 40 accommodated in the housing 10. Further, on a rear face 1b serving as the rear side of the one face 1a of the base 1, an electric motor 60 is arranged for driving a pump (not shown).

Here, in the following description, directions relative to the housing 10 are defined as shown in FIG. 1.

In the connection structure for the electrical component assembly 20 according to the present embodiment, the electrical component assembly 20 arranged on the one face 1a of the base 1 in an orientation perpendicular to the one face 1a of the base 1 is electrically connected to the housing 10 mounted on the one face 1a of the base 1 in a manner of covering the electrical component assembly 20. Further, electrically conductive members 30A and 30B protruding from the electrical component assembly 20 are electrically connected to housing-side connection terminals 16 protruding from the housing 10.

The base 1 is a metal member formed in an approximately rectangular parallelepiped shape. In its inside, a passage R for brake fluid is formed. In the one face 1a of the base 1, attaching holes 2a and 3a used for attaching the solenoid valves 2 and 3 are formed.

The housing 10 is constructed from: a housing body 11 formed from resin in the shape of an approximately rectangular pipe; and a lid (not shown) mounted on a step 12 formed in the front end opening of the housing body 11. The housing body 11 is attached to the one face 1a of the base 1 by using fastening members such as attaching screws. Here, the lid is fixed to the front end opening of the housing body 11 by adhesives, welding, or the like.

In the inside of the housing body 11, an intermediate wall 13 is formed in which a part of the housing-side connection terminals 16 are embedded. The intermediate wall 13 serves as a partition for dividing the inside of the housing 10 into a first accommodation chamber 11A that opens toward the base 1 side and a second accommodation chamber 11B that opens toward the counter-base-1 side.

The first accommodation chamber 11A accommodates the electrical component assembly 20 to be mounted on the solenoid valves 2 and 3. The second accommodation chamber 11B accommodates a control unit 40. Here, the control unit is an electronic board on which a large number of electronic components for control are mounted.

Figure 2A:
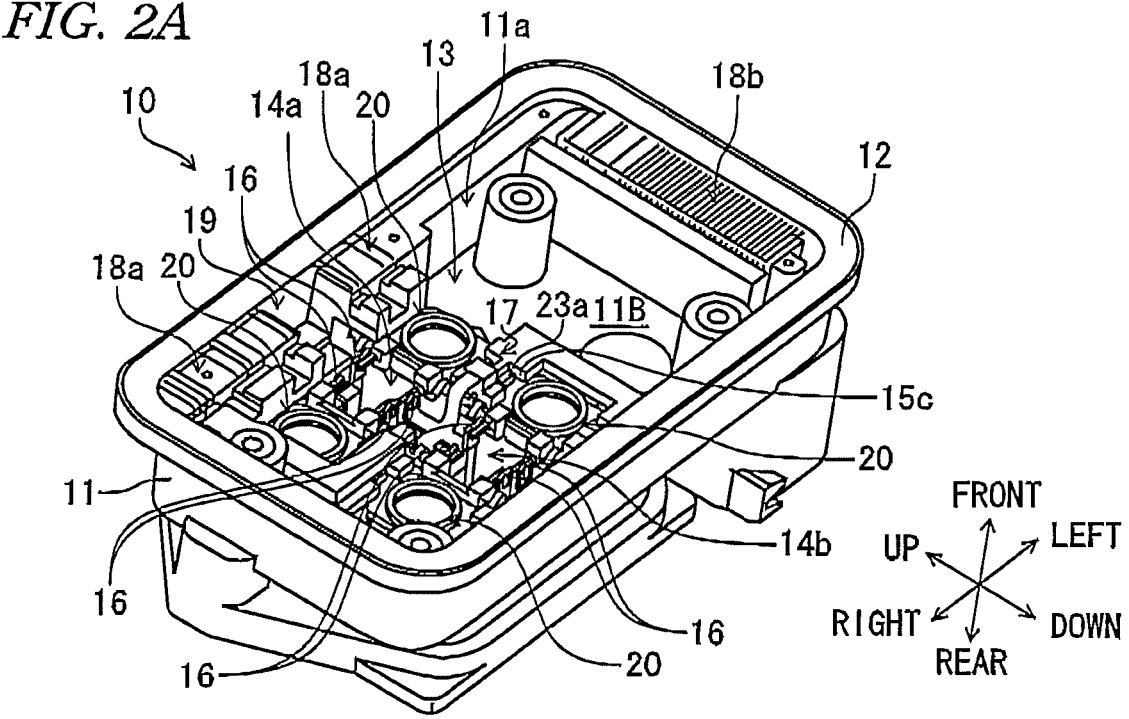
FIGS. 2A and 2B are views of a housing viewed obliquely from front below.
Figure 2B:
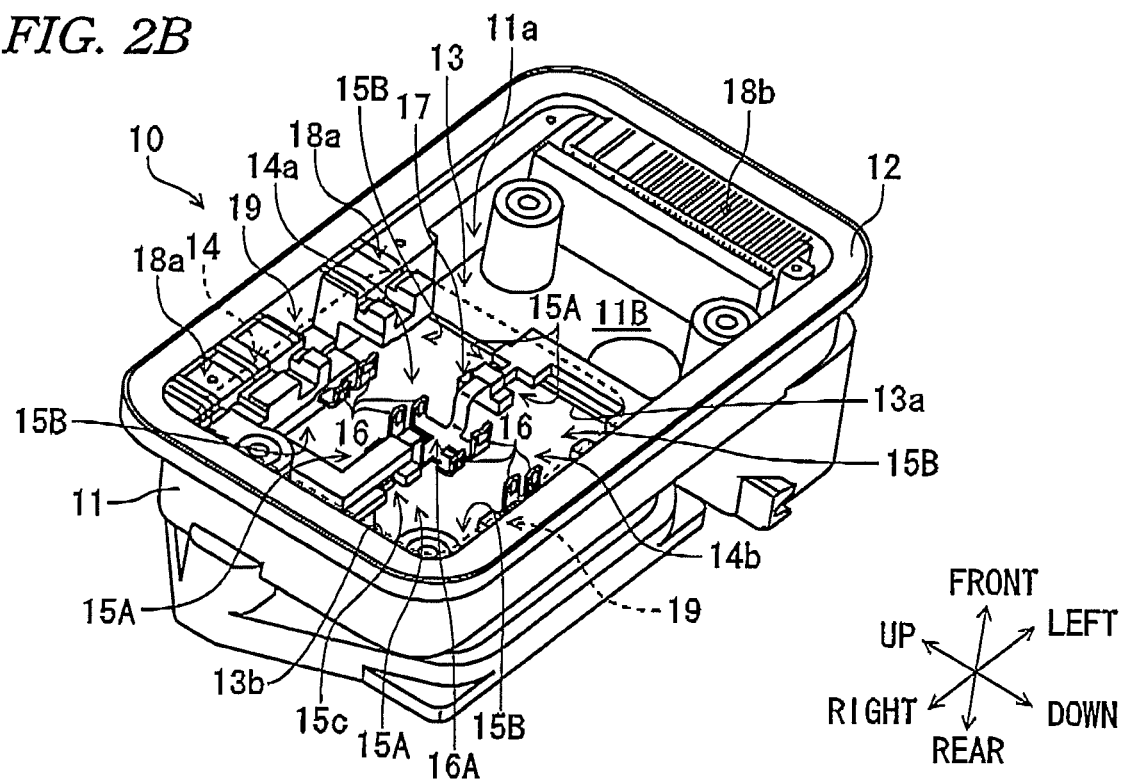

In the inside of the housing 10, as indicated by a dotted line in FIG. 2B, an opening 14 having an approximately quadrangular shape is provided in the intermediate wall 13 (in FIG. 2B, the corners of the opening 14 are shown in rounded shapes). In the opening 14, four electrical component assemblies 20 in total can be arranged (see FIG. 2A). In the present embodiment, the electrical component assemblies 20 are held by the opening 14 and arranged in two rows in the up and down directions of the housing body 11. Then, in each row, pairs of electrically conductive members 30A and 30B of two electrical component assemblies 20 and 20 are arranged such as to face each other in the right and left directions.

Further, the housing-side connection terminals 16 and are arranged in a direction perpendicular to the direction that the pairs of electrically conductive members 30A and 30B face each other.

Further, the electrical component assemblies 20 are accommodated in the housing body 11 in such a manner that the pairs of electrically conductive members 30A and 30B are arranged in parallel with spacing in a direction equal to the up and down directions of a vehicle (that is, the pairs of electrically conductive members 30A and 308 are arranged in a direction equal to the vertical direction of a vehicle, when mounted on a vehicle).

Figure 4A:
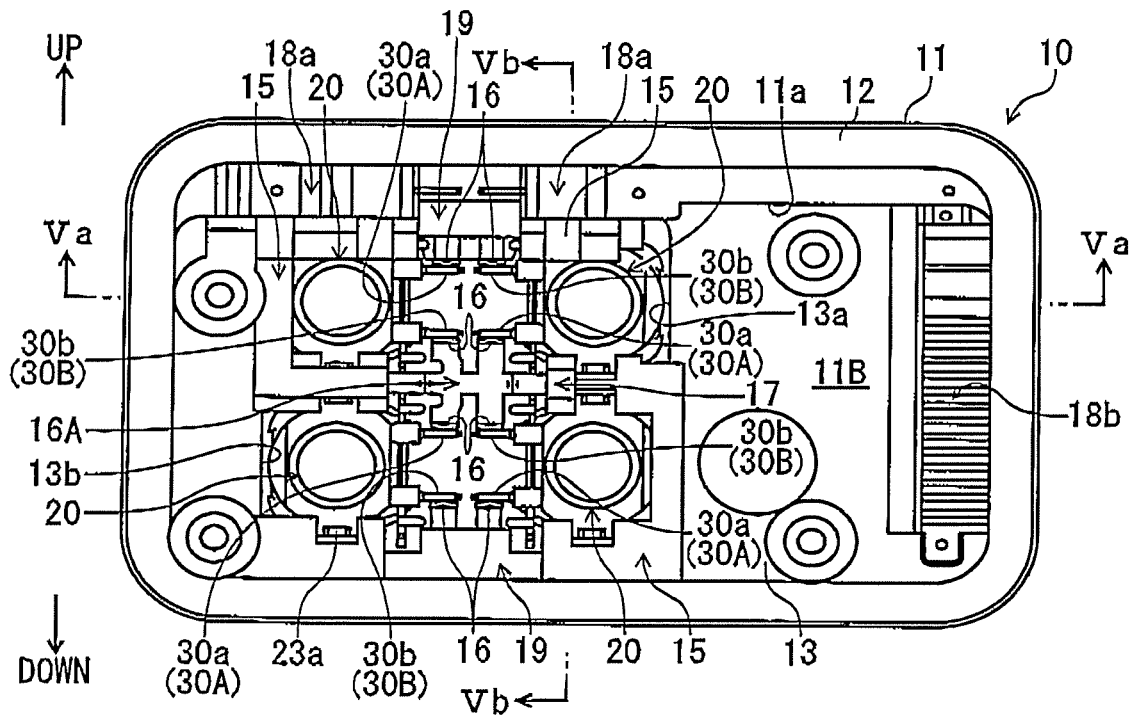
FIGS. 4A and 4B are views of a housing viewed from front.
Figure 4B:
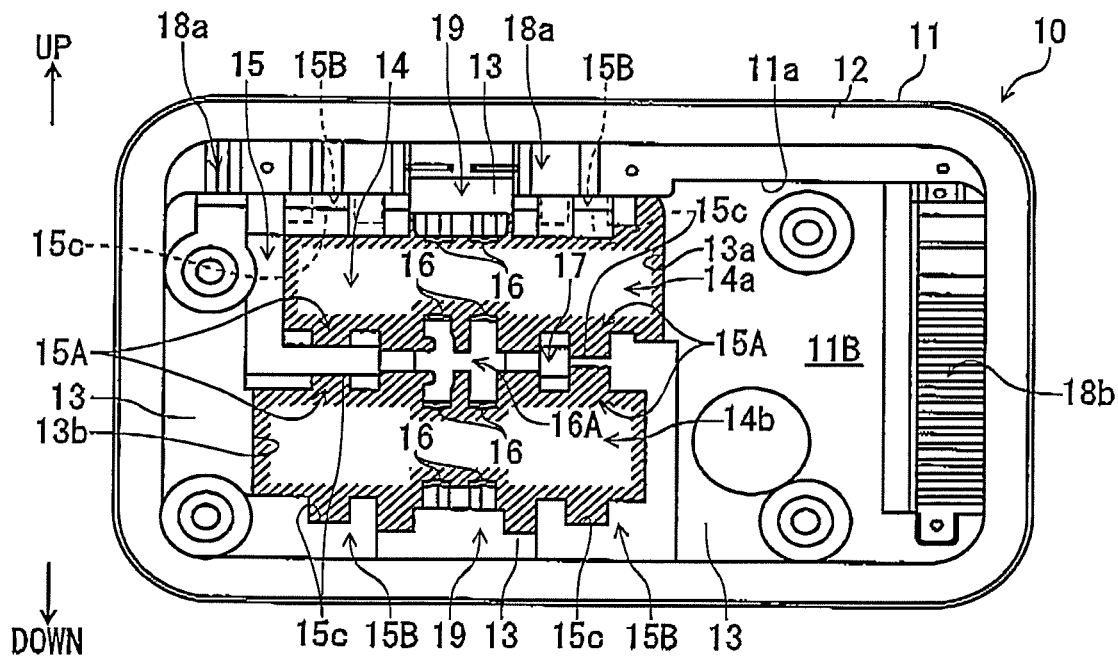

In the opening 14, as shown in FIG. 4B, an extension section 17 extends such as to bridge the mutually opposing edges 13a and 13b of the opening 14. Thus, the opening 14 is divided up and down by the intermediate wall 13 and the extension section 17, into two longitudinal holes 14a and 14b provided in parallel in the up and down directions as shown in FIGS. 2A and 2B. Here, as shown in FIG. 2A, into each of the longitudinal holes 14a and 14b, a pair (two pieces) of electrical component assemblies 20 and 20 are mounted from the rear face side of the housing 10 (from the first accommodation chamber 11A side) in such a manner that the electrical component assemblies 20 and 20 are arranged adjacent to each other with spacing in the right and left directions.

In the extension section 17, the opening edge of each of the longitudinal holes 14a and 14b is provided with a holding section 15A for holding one end of the electrical component assembly 20 (see FIG. 4B). The holding section 15A protrudes from the extension section 17 toward the inside of each of the longitudinal holes 14a and 14b. Then, the holding section 15A abuts against and holds one end of the upper end wall 21 of the electrical component assembly 20 inserted from the first accommodation chamber 11A side.

On the other hand, the opening edge of each of the longitudinal holes 14a and 14b (the intermediate walls 13 and 13) located on a side opposite to the side where the holding section 15A is provided is provided with an edge-side holding section 15B. The edge-side holding section 15B protrudes from the opening edge of each of the longitudinal holes 14a and 14b toward the inside of each of the longitudinal holes 14a and 14b. Then, the edge-side holding section 15B abuts against and holds one end of the upper end wall 21 of the electrical component assembly 20 inserted from the first accommodation chamber 11A side.

That is, one end of the upper end wall 21 abuts against the holding section 15A and the other end of the upper end wall 21 abuts against the edge-side holding section 15B, so that the electrical component assembly 20 is positioned and mounted in the housing 10 in such a manner that positioning is performed at least at the two locations.

Here, as shown in FIG. 4B, in the holding section 15A and the edge-side holding section 15B, a notch 15c is formed, to which an end piece 23a (see FIG. 6A, the same in the following) protruding and formed in the end of the electrical component assembly 20 is engaged. The notch 15c has an approximately quadrangular shape with which the end piece 23a of the electrical component assembly 20 can be engaged.

As shown in FIGS. 2A and 4A, in the second accommodation chamber 11B, the wall 11a of the housing body 11 located near the electrical component assembly 20 is provided with a wire bonding section 18a electrically connected to the control unit 40 (see FIG. 1, the same in the following) by wire bonding. (not shown). The wire bonding section 18a is a part where a plurality of terminals are arranged in parallel in an exposed state. The plurality of terminals are electrically connected through wires to terminals (not shown) provided on the control unit 40 side. In the present embodiment, the control unit 40 is mounted along the wire bonding section 18a and the wire bonding section 18b and on the inner side of them. That is, the control unit 40 is mounted such as to overlap, with spacing, with the electrical component assembly 20 arranged in the opening 14.

In the wire bonding section 18a, a portion opposite to a connection part between the electrically conductive members 30A (30B) and the housing-side connection terminals 16 is provided with a gap 19. The gap 19 is located in a direction perpendicular to the direction where the pair of electrically conductive members 30A and 30B face each other (in a direction where the pair of electrically conductive members 30A and 30B and the housing-side connection terminals 16 and 16 overlap with each other). Further, the gap 19 is formed in a size that permits insertion and movement of the tip part 51 (see FIGS. 9A and 9B, the same in the following) of the electrical connection jig 50 (see FIGS. 9A and 9B, the same in the following), and is feasible as a work space at the time of electrical connection between the electrically conductive members 30A (30B) and the housing-side connection terminals 16.

As shown in FIGS. 4A and 4B, the gap 19 is formed in a size that permits electrical connection to the two housing-side connection terminals 16 and 16 arranged in the edge of longitudinal hole 14a (14b) (in a size having a sufficient depth reaching the opposing part between the housing-side connection terminals 16 and 16 and the electrically conductive members 30A (30B)). Then, the gap 19 is feasible as a shared space at the time of electrical connection between the housing-side connection terminals 16 and 16 and the electrically conductive members 30A (30B). In the gap 19, its front side (the upper part in the page of FIG. 5A) is opened and its rear side (the lower part in the page of FIG. 5A) is a bottom. Then, on the bottom side, the housing-side connection terminals 16 and 16 and the electrically conductive members 30A (30B) are arranged in a mutually opposing manner. That is, the housing-side connection terminals 16 and 16 and the electrically conductive members 30A (30B) are located on the rear side relative to the control unit 40.

As described above, as shown in FIG. 3, the pair of electrical component assemblies 20 arranged in the longitudinal hole 14a (14b) are arranged in a state that the sides in each of which the electrically conductive members 30A and 30B are provided are facing each other. Then, in the longitudinal hole 14a (14b), a gap is formed between the pair of electrical component assemblies 20 and 20. Then, in the gap, the electrically conductive materials 16B extending from the edge side of the opening 14 in the up and down directions are exposed. Then, the ends of the electrically conductive materials 16B are bent so that the housing-side connection terminals 16 are formed. Then, in each of the housing-side connection terminals 16, the connection terminal sections 30a and 30b of the electrically conductive members 30A and 30B are arranged in a crossed state (in an orthogonal state). That is, the connection terminal sections 30a and 30b extend in a direction perpendicular to the direction where it is provided with the electrical component assemblies 20 are arranged in the opening 14 (the longitudinal holes 14a and 14b). Further, the lengths of the connection terminal sections 30a and 30b are set such that welding with the corresponding housing-side connection terminals 16 is allowed and such that the connection terminal sections 30a and 30b are located in a direction perpendicular to the direction where the pair of electrically conductive members 30A and 30B face each other on a side of the housing-side connection terminals 16.

Figure 3:
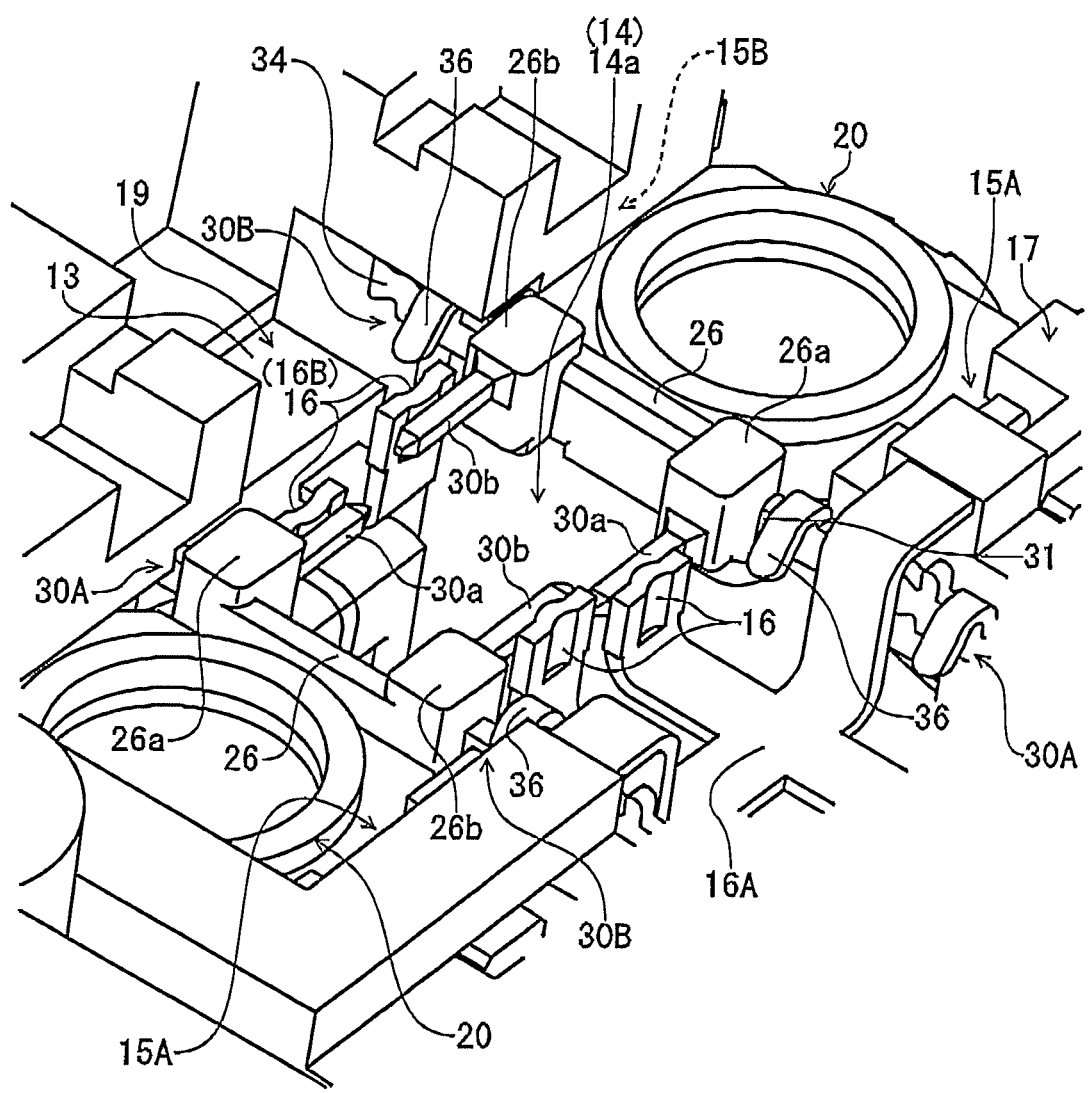
FIG. 3 is an enlarged perspective view showing a connected state between electrically conductive members and housing-side connection terminals.

On the other hand, a large part of the electrically conductive materials 16B are embedded in the housing body 11 or the intermediate wall 13. Then, as shown in FIGS. 2B and 3, the electrically conductive materials 16B protrude into the longitudinal holes 14a and 14b from the opening edges (the edges) of the longitudinal holes 14a and 14b in the intermediate wall 13, and then are bent toward the inside of the second accommodation chamber 11B so as to constitute the housing-side connection terminals 16. Here, as described later, the connection terminal sections 30a and 30b of the electrical component assembly 20 are arranged at a position deviated in the axis direction (see FIG. 6A) of the electrical component assembly 20. Then, the housing-side connection terminals 16 are arranged in correspondence to this deviation.

Further, as shown in FIGS. 2B and 4B, in the extension section 17 arranged between the one longitudinal hole 14a and the other longitudinal hole 14b, the electrically conductive members 16A is exposed in a manner of bridging the left and the right holding sections 15A and 15A of the extension section 17. Then, the housing-side connection terminals 16 are provided toward the longitudinal holes 14a and 14b. In the present embodiment, the housing-side connection terminals 16 (the electrically conductive members 16A) are insert-molded into the extension section 17. Thus, in the middle part of the extension direction of the extension section 17, the housing-side connection terminals 16 (the electrically conductive members 16A) are inserted so that the extension section 17 bridges over the opening 14 via the electrically conductive members 16A.

Figure 6A:
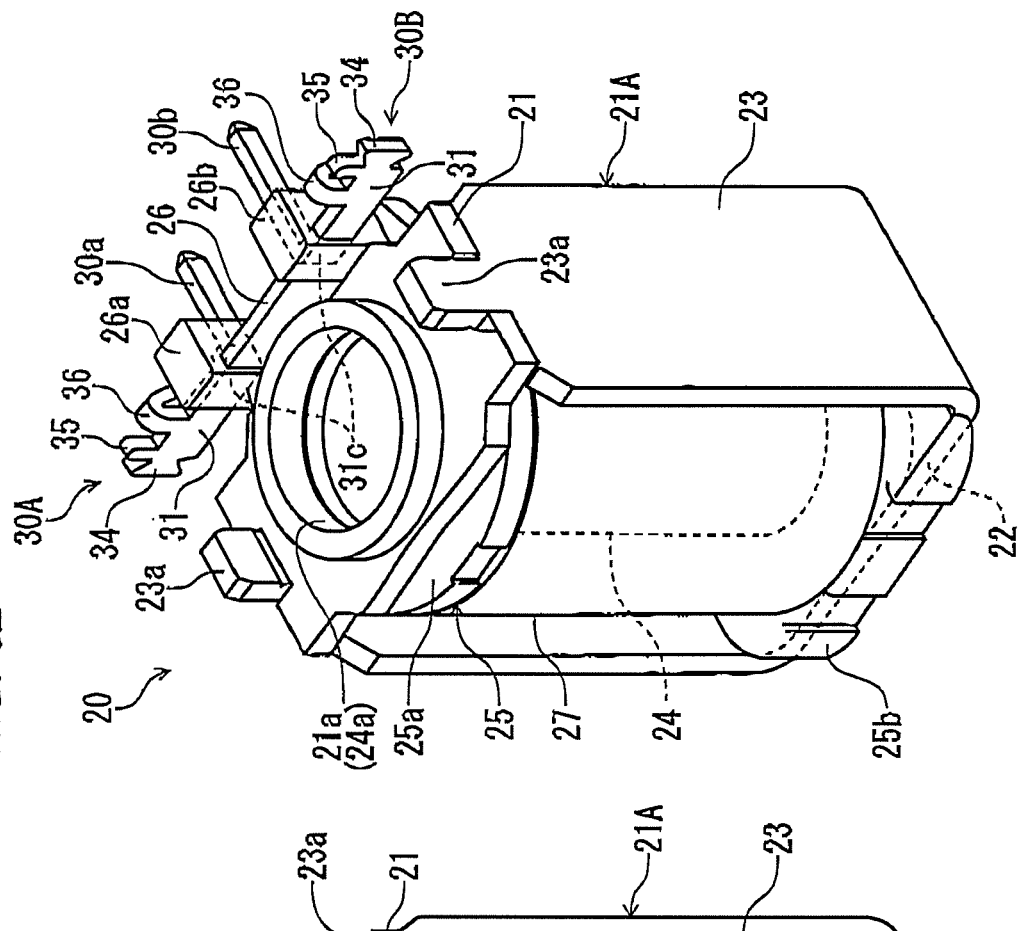
FIGS. 6A and 6B are views showing an electrical component assembly.
Figure 6B:
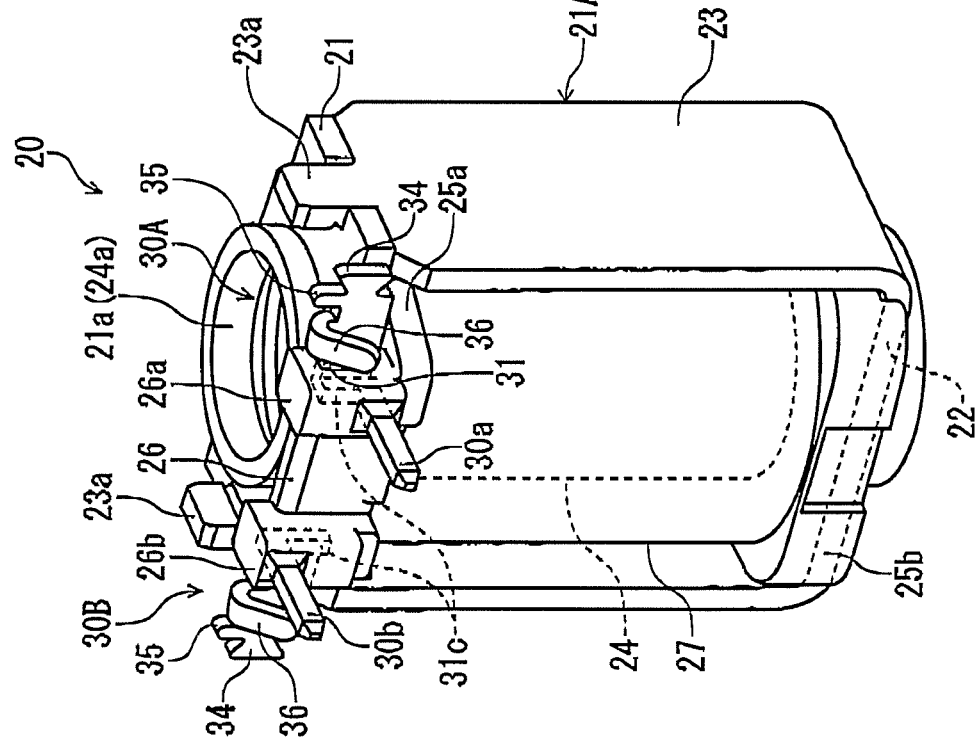

As shown in FIGS. 6A and 6B, the electrical component assembly 20 is a coil device for opening and closing the solenoid valves 2 and 3 (see FIG. 1) when energized, and has: a yoke 21A; a bobbin 25 arranged in the yoke 21A; a coil 27 wound around the bobbin 25; and the electrically conductive members 30A and 30B. As shown in FIG. 1, the electrical component assembly 20 is an electrical component accommodated in the housing 10 in a state of surrounding the solenoid parts of the solenoid valves 2 and 3, and is a magnetic coil for generating a magnetic field around the solenoid valves 2 and 3 (see FIG. 1) when the coil 27 shown in FIGS. 6A and 6B is energized from the housing-side connection terminals 16 and 16 through the connection terminal sections 30a and 30b.

The yoke 21A, is formed from a metallic material having magnetism. Further, as shown in FIG. 6B, the yoke 21A is a component having the shape of a rectangular pipe provided with an upper end wall 21, a lower end wall 22, and left and right side walls 23 and 23, and is magnetic material for improving the magnetic efficiency of the coil 27. Each of the upper end wall 21, the lower end wall 22, and the two side walls 23 and 23 forms a rectangular wall surface. Then, the space surrounded by the upper end wall 21, the lower end wall 22, and the two side walls 23 and 23 accommodates the bobbin 25.

Here, the upper end wall 21 serves as an abutting surface that abuts against the holding section 15A and the edge-side holding section 15B.

In the present embodiment, a bent plate member having a U-shape constituting the lower end wall 22 and the two side walls 23 and 23 is combined with the upper end wall 21 having a flat plate shape, and then the end pieces 23a and 23a of the two side walls 23 and 23 are fixed to the upper end wall 21 so that the yoke 21A is constructed.

Further, a circular hole 21a is formed in the center part of the upper end wall 21, and a hole (not shown) of the same size is formed also in the center part of the lower end wall 22.

Figure 7A:
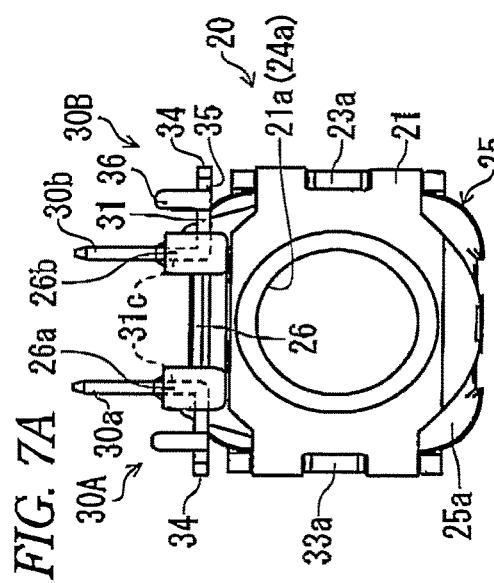
FIGS. 7A to 7D are views showing an electrical component assembly.
Figure 7B:
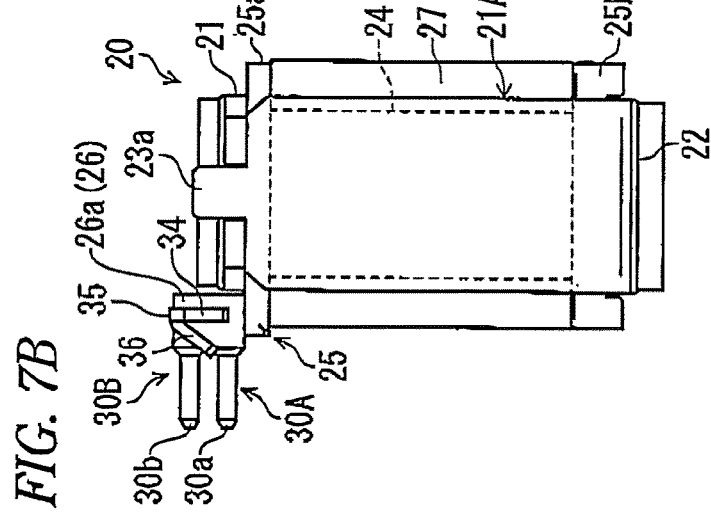
Figure 7C:
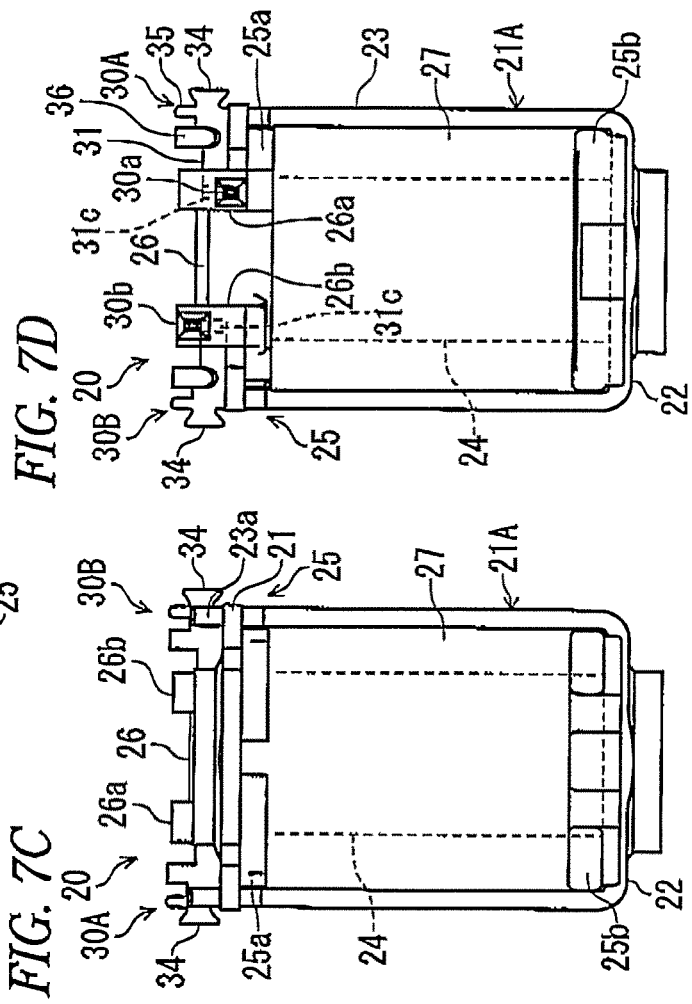
Figure 7D:
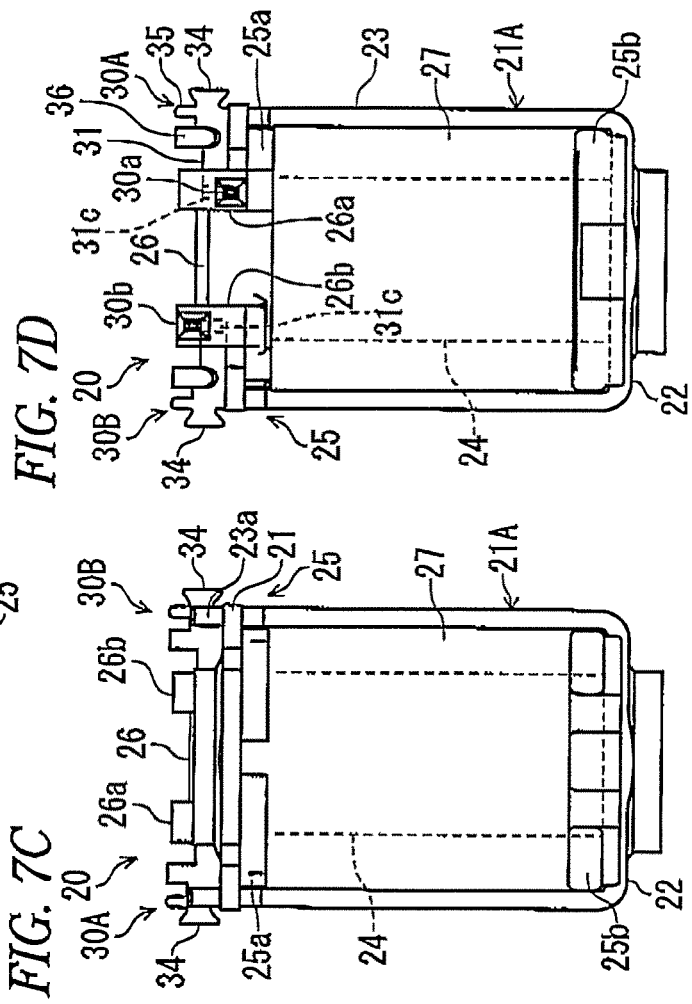

As shown in FIGS. 7B, 7C, and 7D, the bobbin 25 is a resin component provided with a cylinder section 24 and flanges 25a and 25b formed at both of the up and down ends of the cylinder section 24. The center part of the bobbin 25 is provided with a circular center hole 24a (see FIG. 7A) which is a through hole.

The bobbin 25 is accommodated in the yoke 21A. Then, the upper flange 25a is attached to the lower face of the upper end wall 21, and the lower flange 25b is attached to the upper face of the lower end wall 22. The center hole 24a of the bobbin 25 is in communication with the hole 21a of the upper end wall 21 and a hole (not shown) of the lower end wall 22.

In the present embodiment, as shown in FIG. 7A, the upper flange 25a of the bobbin 25 protrudes in a radial direction of the bobbin 25 relative to the upper end wall 21 of the yoke 21A.

Further, in the upper flange 25a, in a portion protruding rearward relative to the upper end wall 21, that is, at the end (rearward) of the upper end wall 21, a terminal supporting section 26 (a resin part) is formed where the pair of electrically conductive members 30A and 30B are formed integrally. The terminal supporting section 26 has square-shaped protruding sections 26a and 26b. Then, the center parts (the bent portions serving as resin embedded sections 31c and 31c) of the pair of electrically conductive members 30A and 30B are embedded (included) into these protruding sections 26a and 26b by insert molding.

As shown in FIGS. 6A, 6B, and 7A to 7D, the pair of electrically conductive members 30A and 30B are bar-shaped metal components whose center parts are embedded in the protruding sections 26a and 26b of the terminal supporting section 26. The pair of electrically conductive members 30A and 30B have left and right symmetrical shapes having only a difference between the positions where the connection terminal sections 30a and 30b are provided (the position in the axis direction of the electrical component assembly 20). Thus, the following description is given for the one electrically conductive member 30A, and the electrically conductive member 30B is described only when necessary.

As shown in FIG. 7A, the electrically conductive members 30A has an approximately L-shape in plan view. Then, the center part serving as the resin embedded section 31c is embedded in the protruding section 26a. More specifically, the electrically conductive member 30A has: an extending section 31 extending leftward in the figure along the rear face (the face on which the electrically conductive member 30A is provided) of the electrical component assembly 20; and a connection terminal section 30a protruding rearward from the rear face similarly in a direction perpendicular to the rear face. Here, in the electrically conductive member 30B, the center part serving as the resin embedded section 31c is embedded in the protruding section 26b, and the extending section 31 extends in the right direction in the figure.

Figure 5A:
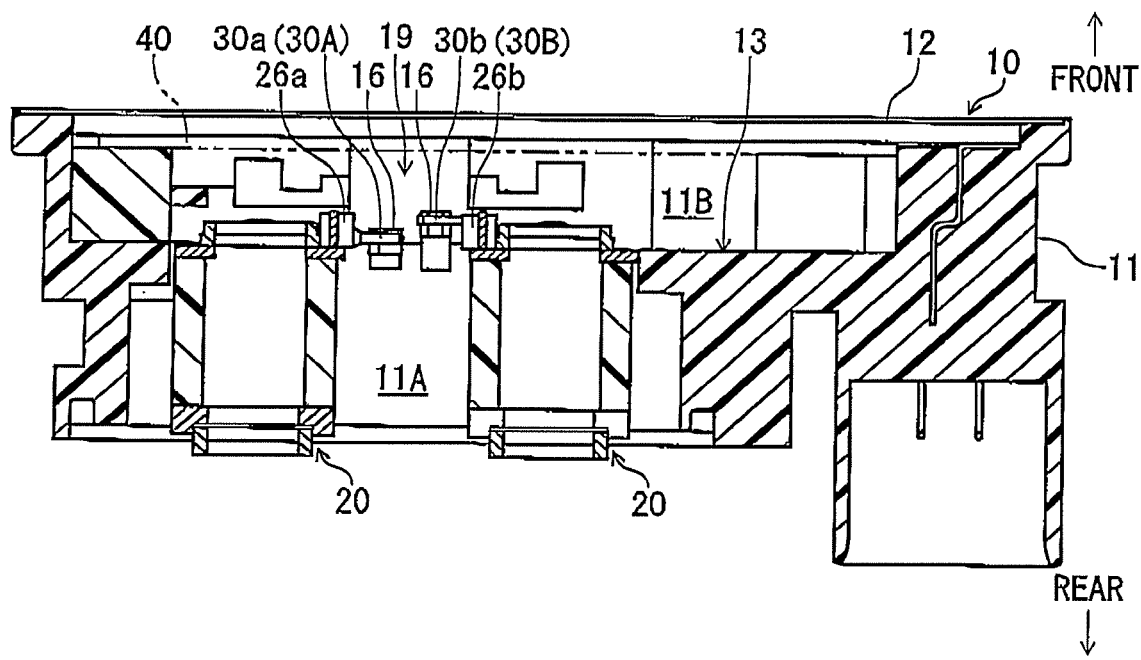
FIGS. 5A and 5B are sectional views of a housing.
Figure 5B:
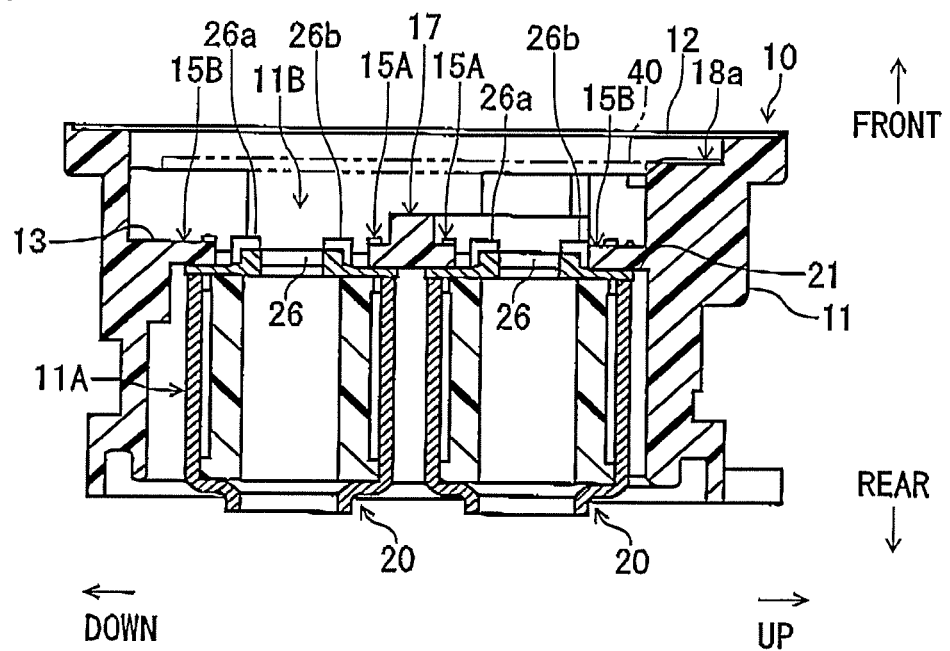

On the other hand, the extending sections 31 and the connection terminal sections 30a and 30b extend in a direction along the intermediate wall 13 (see FIGS. 3 and 5A; in a direction perpendicular to the axis direction of the electrical component assembly 20).

The extending section 31 has: a wire connection section 36 to which a wire (not shown) from the coil 27 is electrically connected; and a winding section 34 which is formed on the end side relative to the wire connection section 36 and around which a tip part of the wire is wound.

The wire connection section 36 is composed of a tongue piece that can be bent toward the rear face side of the extending section 31 (FIGS. 6A to 7D show a state of being bent). Then, a wire (not shown) is pinched and welded in the inner side of the bent so that electrical connection of the wire is achieved. As shown in FIGS. 7C and 7D, the winding section 34 is provided by forming wedge-shaped cuts in the extending section 31 in the up and down directions. Then, the wire is wound around the wedge-shaped cut parts.

Here, on a side of the winding section 34, a guide piece 35 for guiding the wire to the winding section 34 is formed in a manner of rising upward.

In the approximately center part (the resin embedded section 31c) of the electrically conductive member 30A, the connection terminal section 30a is bent by 90 degrees in a direction departing from the electrical component assembly 20, and protrudes rearward from the rear face of the electrical component assembly 20 as described above. The connection terminal section 30a has a thinner shape than the extending section 31, and is elastically deformable.

In the present embodiment, the electrically conductive members 30A and 30B may be constructed in the form of a hoop terminal, that is, may be manufactured in the form of an assembled component in which the resin embedded sections 31c and 31c are embedded in the protruding sections 26a and 26b of the terminal supporting section 26 via a linkage section 38 described later so that the electrically conductive members 30A and 30B and the bobbin 25 are formed integrally with each other.

Such an assembled component is manufactured by a press punching step, a bending processing step, a resin molding step, and a separation step which are described below.

Figure 8A:
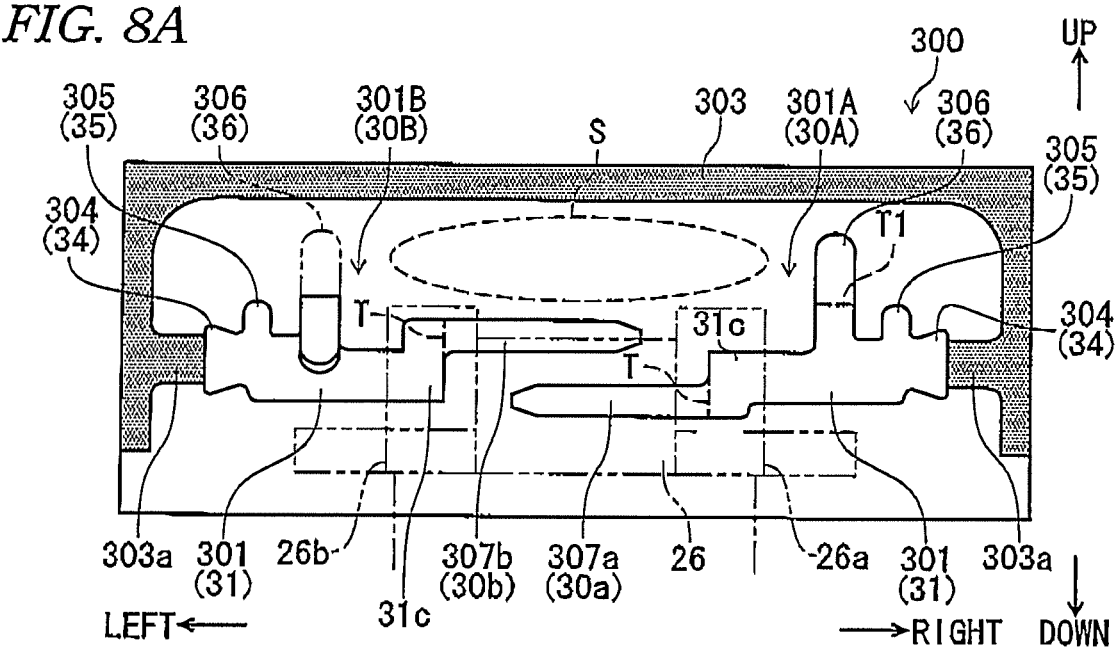
FIG. 8A is a layout view related with punching of electrically conductive members (a press-punched component) in an electrical component assembly according to an embodiment.

As shown in FIG. 8A, at the press punching step, a press-punched component 300 provided with electrically conductive plates 301A and 301B serving as the sources of the electrically conductive members 30A and 30B is obtained by press punching. At the press punching step, the press-punched component 300 is obtained from a flat belt-shaped metal plate or the like having electrical conductivity and a certain thickness.

The press-punched component 300 has: a linkage section 303 having a frame shape and serving as a carrier; and electrically conductive plates 301A and 301B formed continuously to the linkage section 303 via connection sections 303a and 303b. These components are formed based on the above-mentioned terminal structure.

The electrically conductive plates 301A and 301B have: tapered shape sections 304 to be formed into the winding sections 34; small protruding pieces 305 to be formed into the guide pieces 35; protruding pieces 306 to be formed into the wire connection sections 36; and extension pieces 307a and 307b to be formed into the connection terminal sections 30a and 30b.

The guide pieces 35 and the protruding pieces 306 extend in the up and down directions (in the transverse direction) of the linkage section 303. Further, the extension pieces 307a and 307b extend in the right and left directions (in the longitudinal direction) of the linkage section 303.

The extension pieces 307a and 307b are arranged alternately in the up and down directions in the center part of the press-punched component 300 in such a manner that overlapping is avoided. That is, the extension piece 307a extends from the lower side of the center part of the base 301 to be formed into the extending section 31, toward the extension piece 307b side. Further, the extension piece 307b extends from the upper side of the center part of the base 301 toward the extension piece 307a side. Thus, the extension pieces 307a and 307b are arranged opposite to each other with spacing in the up and down directions in the center part of the press-punched component 300 in such a manner that interference with each other is avoided.

Then, at the bending processing step, bending processing is performed on the protruding pieces 306 of the electrically conductive plates 301A and 301B and on the extension pieces 307a and 307b (the center side parts of the bases 301). That is, the protruding pieces 306 are bent from the middle part toward the base 301 side such as to become capable of pinching a wire (not shown) (that is, bent such as to rise from the plate surface of the press-punched component 300 to the near side along on the bending line T1, and then bent toward the lower direction of the press-punched component 300 such as to face the upper face of the base 301 like in the connection terminal sections 30a and 30b in FIG. 7A). Further, in such a manner that the extension pieces 307a and 307b protrude at right angles relative to the plate surfaces of the press-punched component 300, bending processing is performed on the extension pieces 307a and 307b along the bending lines T and T toward the left and the right such as to rise from the plate surface of the press-punched component 300 to the near side.

After that, at the resin molding step, insert molding is performed such that the bent portions of the extension pieces 307a and 307b are formed as the resin embedded sections 31c and 31c. In this insert molding, the protruding sections 26a and 26b (the terminal supporting section 26) are formed such as to include the bent portions, and the bobbin 25 is formed integrally with this.

After that, at the separation step, the connection sections 303a are separated so that the electrically conductive plates 301A and 301B are separated from the linkage section 303. As a result, an assembled component is obtained in which the resin embedded sections 31c and 31c of the electrically conductive members 30A and 30B are embedded in the protruding sections 26a and 26b of the terminal supporting section 26 of the bobbin 25.

Here, in the above-mentioned press-punched component 300, the region S surrounded by the linkage section 303, the left and right protruding pieces 306 and 306, and the extension piece 307b is discarded at the above-mentioned press punching step. This region S is smaller than regions S' and S' discarded in a press-punched component 300' (see FIG. 8B) according to the conventional art.

Figure 8B:
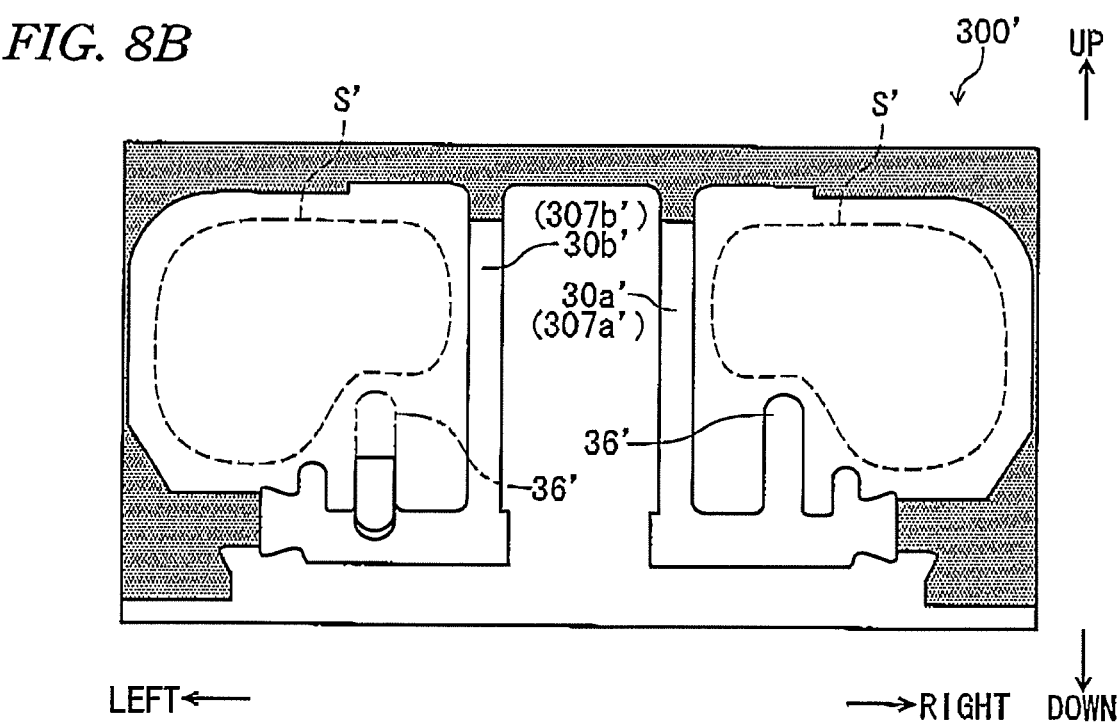
FIG. 8B is a layout view related with punching of electrically conductive members (a press-punched component) according to a comparison example.

That is, in the conventional press-punched component 300' shown in FIG. 8B, extension pieces 307a' and 307b' to be formed into connection terminal sections 30a' and 30b' extend (rise) in the up and down directions (in the transverse direction). Thus, a linkage section 303' has a larger size in the up and down directions, and hence at the press punching step, the punching need be performed in a larger size by this length of the rise. Thus, at the press punching step, such larger regions S' and S' need be discarded.

In contrast, in the present embodiment, the extension pieces 307a and 307b extend toward the right and left directions (in the longitudinal direction) of the linkage section 303, and arranged alternatively opposite to each other such as not to overlap in the up and down directions. Thus, as shown in FIG. 8A, a length corresponding to the rise of the protruding pieces 306 and 306 to be formed into the wire connection sections 36 and 36 is sufficient in the up and down directions (in the transverse direction). Thus, as described above, it is sufficient that a region S much smaller than the conventional regions S' and S' is discarded at the press punching step.

Next, assembling of the electrical component assembly 20 into the housing 10 is described below. At the time of assembling of the electrical component assembly 20, the electrical component assembly 20 is inserted from the first accommodation chamber 11A side of the housing 10 such that the one end and the other end of the upper end wall 21 of the electrical component assembly 20 abut against the holding section 15A and the edge-side holding section 15B of the longitudinal holes 14a and 14b of the intermediate wall 13. As a result, the connection terminal sections 30a and 30b of the electrically conductive members 30A and 30B are arranged on a side of the housing-side connection terminals 16 (see FIGS. 2A, 3, and 5A).

Figure 10A:
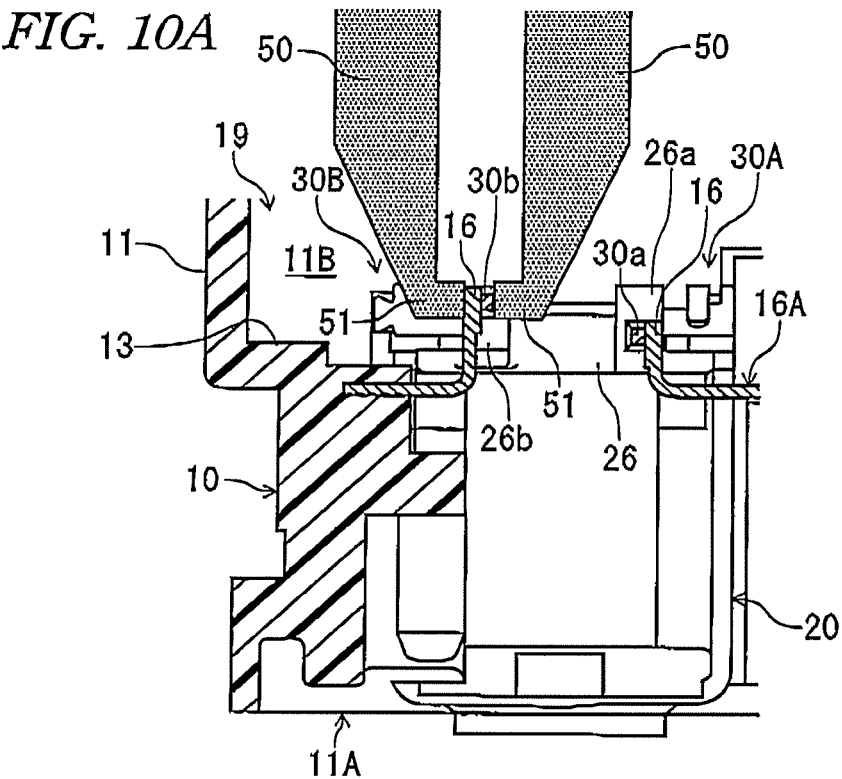
FIGS. 10A and 10B are explanation views showing a step of electrical connection between the electrically conductive members and the housing-side connection terminals.

Then, as shown in FIG. 9A, the pair of electrical connection jigs 50 and 50 are moved from the second accommodation chamber 11B side (the counter-base-1 side) of the housing 10 into the second accommodation chamber 11B such as that the tip part 51 of the one electrical connection jig 50 is located in the gap 19 as shown in FIG. 9B. As a result, for example, the connection part between the connection terminal section 30b of the electrically conductive member 30B and the housing-side connection terminal 16 is pinched between the two tip parts 51 and 51 in a non-contacting state. After that, as shown in FIG. 10A, the electrical connection jigs 50 and SO are made close to each other such that the two tip parts 51 and 51 pinches the connection terminal section 30b and the housing-side connection terminal 16.

In this state, an electric current is supplied through the electrical connection jig 50 so that the electrically conductive member 30B and the housing-side connection terminals 16 are welded (electrically connected) to each other. On completion of electrical connection between the electrically conductive member 30B and the housing-side connection terminals 16, pinching by the tip parts 51 and 51 is released so that the electrical connection jig 50 is moved in a right or left direction so as to be located at a position where the connection part between the connection terminal section 30a of the electrically conductive member 30A in the adjacent electrical component assembly 20 and the housing-side connection terminal 16 is pinched between the two tip parts 51 and 51 in a non-contacting state similarly to the above-mentioned operation. In this case, one tip part 51 is moved in the right and left directions in a state of being located within the gap 19 with using the space in the gap 19. Further, with using the space formed between the connection terminal section 30a and the connection terminal section 30b, the other tip part 51 is moved in the right and left directions in a state of being located in this space. Then, after the movement, the connection part between the connection terminal section 30a of the electrically conductive member 30A and the housing-side connection terminal 16 is pinched and electrically connected by the two tip parts 51 and 51 similarly to the above-mentioned operation.

Figure 10B:
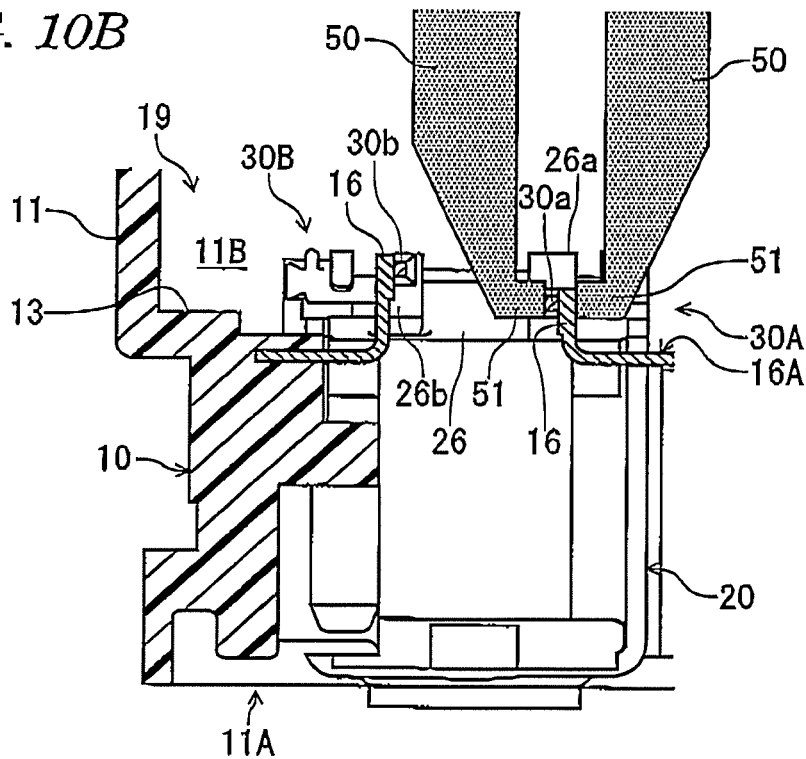

After that, as shown in FIG. 10B, the connection part between the connection terminal section 30a of the electrically conductive member 30A and the housing-side connection terminals 16 is pinched, and then an electric current is supplied through the electrical connection jig 50 in this state so that the electrically conductive member 30A and the housing-side connection terminals 16 are welded (electrically connected) to each other.

Further, electrical connection between other electrically conductive members 30A and 30B and housing-side connection terminals 16 and 16 is performed sequentially.

When electrical connection work has been completed for all electrically conductive members 30A and 30B and housing-side connection terminals 16, the control unit 40 is attached to the housing 10 as shown in FIG. 1. Then, a lid (not shown) is attached so that the housing 10 is completed. After that, at steps similar to those of the conventional, various kinds of components such as the solenoid valves 2 and 3 and the housing 10 are attached to the base 1 so that the brake control apparatus U is manufactured.

As described above, the connection terminal sections 30a and 30b of the pair of electrically conductive members 30A and 30B are bent toward a side departing from the coil so as to protrude toward the electrical component assembly 20, and one connection terminal section 30a is arranged at a position deviated in an axis direction of the coil 27 relative to the other connection terminal section 30b. Thus, in comparison with a case that the electrically conductive members rise along the axis direction of the coil 27 like in the conventional art, the size is reduced in the axis direction of the electrical component assembly 20 which is equal to the axis direction of the coil 27. Thus, size reduction is achieved in the housing 10 into which the electrical component assembly 20 is assembled and in the brake control apparatus U having this housing 10.

Further, at the time of formation of the electrically conductive members 30A and 30B from a metal plate or the like by press punching, the electrically conductive members 30A and 30B are formed by press punching by using a layout that the connection terminal sections 30a and 30b of the electrically conductive members 30A and 30B are located alternately opposite to each other on the metal plate. This minimizes unnecessary parts after the press punching. Thus, in comparison with the conventional art, a loss in the material is reduced and the production yield is improved. This realizes cost reduction and improves the manufacturing efficiency.

Further, the electrically conductive members 30A and 30B are electrically connected in a crossing state to the housing-side connection terminals 16 provided in the intermediate wall 13 extending in a direction parallel to the protruding direction of the electrically conductive members 30A and 30B. Thus, the housing-side connection terminals 16 are arranged on the housing 10 side in a space-saving manner. Further, a situation is suppressed that the electrically conductive members 30A and 30B protrude toward the housing 10 side. Thus, size reduction is achieved in the brake control apparatus U into which the electrical component assembly 20 is assembled.

Further, in the housing 10, the control unit 40 is allowed to be arranged close to the electrical component assembly 20. This increases flexibility in the design.

Further, the connection terminal sections 30a and 30b are formed in the bobbin 25 integrally in such a manner that the bent portions serving as the resin embedded sections 31c and 31c of the connection terminal sections 30a and 30b are included in the inside. Thus, in a state that the strength of the bent portions is improved, the connection terminal sections 30a and 30b can be provided integrally with the bobbin 25. Thus, the bobbin 25 with which the connection terminal sections 30a and 30b are formed integrally can be formed efficiently.

The wire bonding section 1ea has the gap 19. Thus, the tip part 51 of the electrical connection jig 50 can be inserted through this gap 19. Thus, the tip part 51 of the electrical connection jig 50 can appropriately be arranged on a side of the connection part between the electrically conductive members 30A (30B) and the housing-side connection terminals 16. Then, the tip part 51 of the electrical connection jig 50 can be moved within the gap 19 so that electrical connection work can be performed appropriately.

Thus, in a state that a certain space used for insertion and movement of the tip part 51 of the electrical connection jig 50 is ensured in the housing 10, size reduction of the housing 10 is achieved.

Further, at the time of electrical connection, when the tip part 51 of the electrical connection jig 50 is inserted toward the gap 19, the tip part 51 of the electrical connection jig 50 can easily be arranged on a side of the connection part between the electrically conductive members 30A (30B) and the housing-side connection terminals 16. This improves workability in the electrical connection work.

Further, the wire bonding section 18a can be arranged close to the electrical component assembly 20. This improves cabling easiness of the electrically conductive materials 16B and flexibility in the design of the housing 10.

Further, the gap 19 is formed in a size that permits electrical connection of the two housing-side connection terminals 16 and 16 arranged in the edge of the longitudinal hole 14a (14b). Thus, the gap 19 is feasible as a shared space at the time of electrical connection between the housing-side connection terminals 16 and 16 and the electrically conductive members 30A (30B). Thus, at the time of electrical connection, the tip part 51 of the electrical connection jig 50 is move within the gap 19 to the position corresponding to the two housing-side connection terminals 16 and 16 and then electrical connection between the two housing-side connection terminals 16 and 16 and the electrically conductive members 30A (30B) are performed successively. This avoids complicated operation that electrical connection is performed with extracting and moving at each time the tip part 51 of the electrical connection jig 50 from the gap 19. Thus, the cycle time in electrical connection is shortened, and hence productivity is improved.

Further, the plurality of electrical component assemblies 20 are arranged in two rows in the housing 10 in such a manner that a pair of the electrically conductive members 30A (30B) face each other between the rows. Thus, the locations of welding between the electrically conductive members 30A (30B) and the housing-side connection terminals 16 are collected to a location between the electrical component assemblies 20 which is a location between the rows. Thus, even in a connection structure having a plurality of electrical component assemblies 20, the cycle time can be reduced in the electrical connection work. This improves productivity.

The intermediate wall 13 of the housing body 11 is provided with the opening 14 having an approximately quadrangular shape and capable of accommodating a plurality of electrical component assemblies 20. Further, the extension section 17 extending such as to bridge the mutually opposing edges of the opening 14A is provided with the holding section 15A and the edge-side holding section 15B against which the end of the electrical component assembly 20 abuts so that positioning is achieved. Thus, in such a manner that the holding section 15A and the edge-side holding section 15B respectively abut against the one end and the other end of the upper end wall 21 of the electrical component assembly 20 so that positioning is achieved, the plurality of electrical component assemblies 20 can be arranged into the opening 14 (the longitudinal holes 14a and 14b).

Further, the large opening 14 is provided that is capable of accommodating a plurality of electrical component assemblies 20. Thus, the amount of resin material used in the intermediate wall 13 can be reduced as much as possible. Thus, weight reduction of the housing 10 is achieved.

Further, the extension section 17 bridges the mutually opposing edges 13a and 13b of the opening 14. Thus, the electrical component assembly 20 can abut compactly and effectively with desired strength.

Further, the holding section 15A and the edge-side holding section 15B are provided with the notch 15c with which the end piece 23a of each electrical component assembly 20 is engaged. Thus, when the electrical component assembly 20 is to be arranged into the opening 14, the end piece 23a of the electrical component assembly 20 is engaged with the notch 15c so that the electrical component assembly 20 can easily and reliably be positioned into the opening 14 (the longitudinal holes 14a and 14b). Thus, positioning of the electrical component assembly 20 is achieved easily, and so is the assembling work. This contributes to improvement of productivity.

Further, the housing-side connection terminals 16 (the electrically conductive members 16A) are insert-molded into the extension section 17. Thus, in a state that the electrical component assembly 20 is positioned, the housing-side connection terminals 16 can be arranged near the connection terminals 30a and 30b of the electrical component assembly 20. Thus, space-saving is achieved, and electric connection is easily performed between the housing-side connection terminals 16 and the connection terminals 30a and 30b.

Further, in the extension section 17, the housing-side connection terminals 16 are inserted in a middle part in the extension direction. Thus, the amount of use of resin material is reduced as much as possible by the amount corresponding to the presence of the housing-side connection terminals 16. Thus, weight reduction of the housing 10 is achieved.

Further, the electrical component assembly 20 is accommodated in the housing 10 in such a manner that the pair of electrically conductive members 30A and 30B are arranged in parallel with spacing in a direction equal to the vertical direction of the vehicle on which the apparatus is mounted. Thus, the electrical component assembly 20 has resistance against vibrations in the vertical direction of the vehicle. That is, the pair of electrically conductive members 30A and 30B arranged up and down with spacing receive forces tending to mutually cancel out (a tensile force acting on one electrically conductive member 30A in the axis direction is cancelled out by a compressive force acting on the other electrically conductive member 30B in the axis direction). This provides resistance against vibrations in the up and down directions transmitted from the vehicle side.

According to the brake control apparatus U employing the housing 10 of the present embodiment, size reduction is achieved in a state that a certain space used for insertion of the tip part 51 of the electrical connection jig 50 is ensured in the housing 10.

Second Embodiment

A second embodiment of the present invention is described below. A difference in the present embodiment from the first embodiment is that the extension section 17 is reinforced by reinforcement ribs 17a and 17b.

Figure 11A:
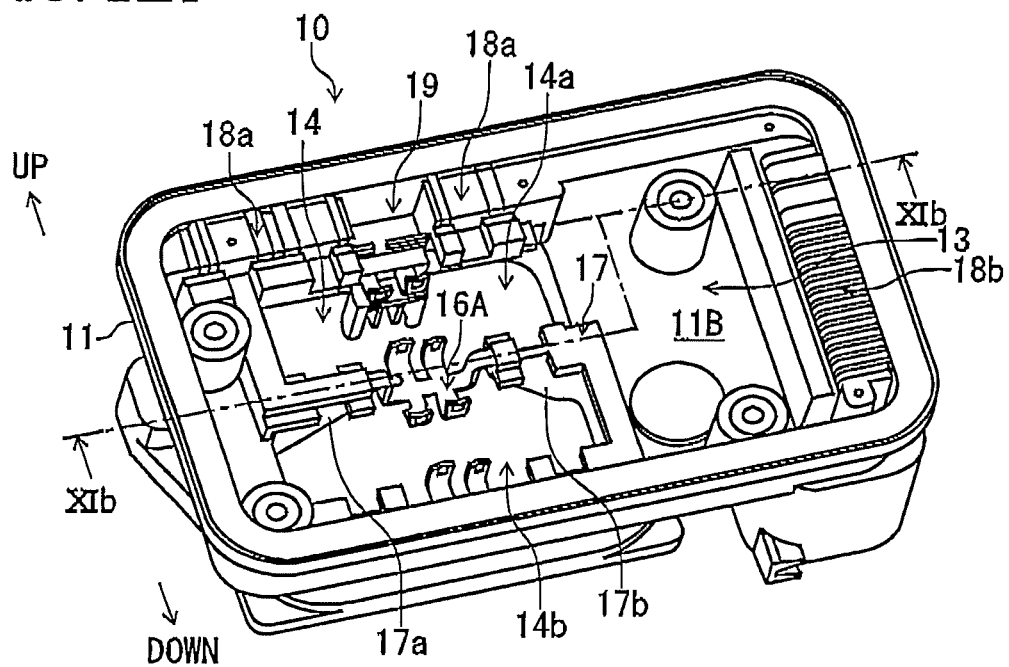
FIGS. 11A and 11B are views showing a housing of a vehicle brake hydraulic pressure control apparatus serving as an example of a hydraulic pressure control apparatus to which a connection structure for electrical component assembly according to a second embodiment of the present invention is applied.
Figure 11B:
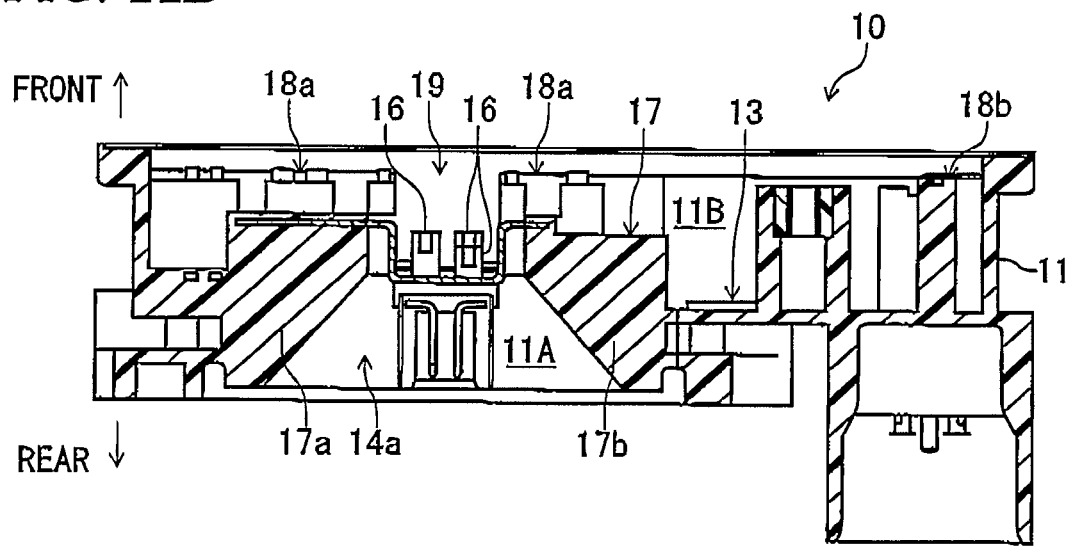

As shown in FIGS. 11A and 11B, the reinforcement ribs 17a and 17b protrudes in the axis direction of the electrical component assembly 20 along the extension direction of the extension section 17, and has an approximately triangular shape when viewed from the up and down directions as shown in FIG. 11B.

Figure 12A:
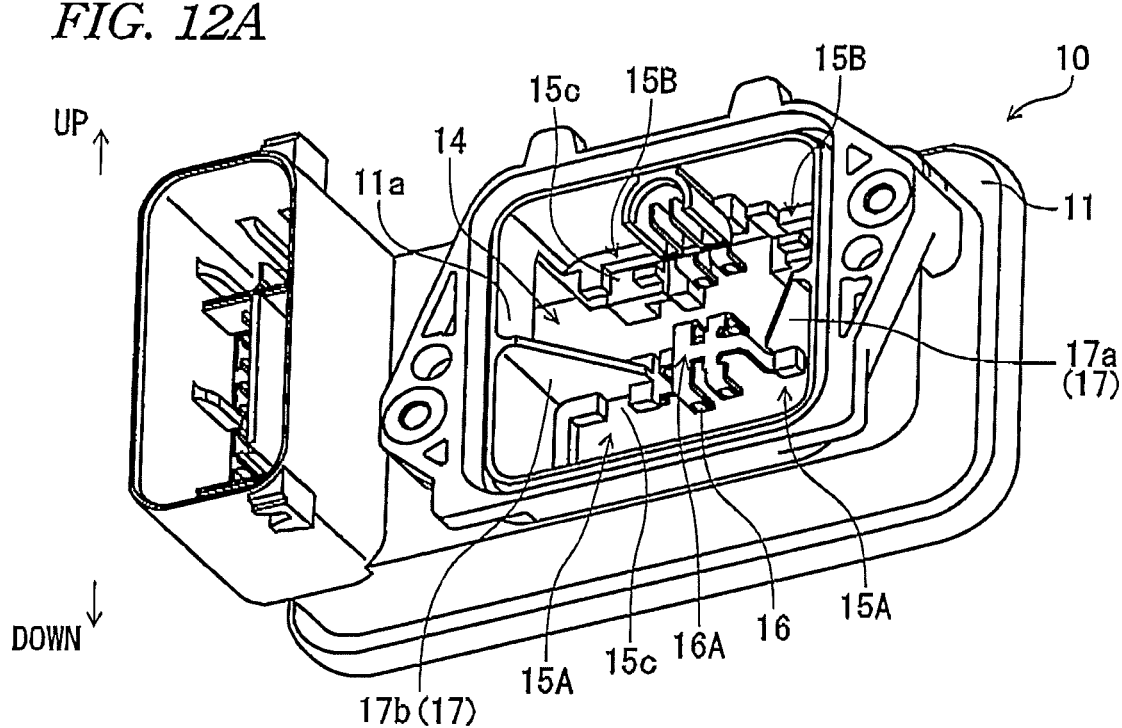
FIG. 12A is a view of a housing viewed obliquely from rear below in a state before an electrical component assembly is mounted.
Figure 12B:
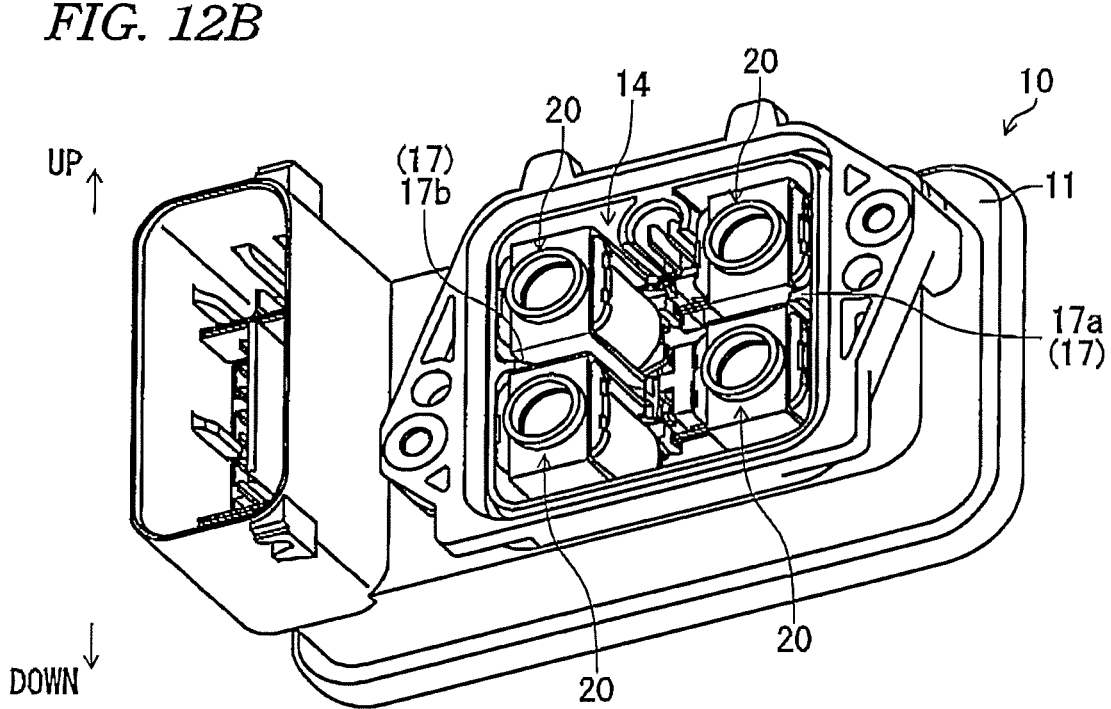
FIG. 12B is a view of a housing viewed obliquely from rear below in a state that an electrical component assembly is mounted.

As shown in FIG. 12A, in the reinforcement ribs 17a and 17b, the pedestal side is connected integrally to the wall 11a surrounding the electrical component assembly 20. Then, as shown in FIG. 12B, the reinforcement ribs 17a and 17b serve as a partition that partly separates from each other the electrical component assemblies 20 and 20 adjacent in the up and down directions, in a part between the up and the down longitudinal holes 14a and 14b.

According to the present embodiment, the reinforcement ribs 17a and 17b are provided in the extension section 17. Thus, in spite of the structure that the extension section 17 bridges over the opening 14, its strength is ensured so that the extension section 17 can appropriately position and hold the electrical component assembly 20. Further, the reinforcement ribs 17a and 17b protrude in the axis direction of the electrical component assembly 20 and hence can be arranged, for example, by using a space formed between adjacent electrical component assemblies 20. This realizes space-saving.

The mode of implementing the present invention has been described above. However, the present invention is not limited to these embodiments, and design variations may be applied within a range not departing from the spirit of the present invention.

For example, the embodiments have been described for a configuration that electrical connection between the electrically conductive members 30A and 30B and the housing-side connection terminals 16 is performed in the second accommodation chamber 11B. However, the configuration is not limited to this. That is, these components may extend (protrude) into the first accommodation chamber 11A, and then electrical connection may be performed in the first accommodation chamber 11A. In this case, the electrical connection jig 50 (electrode) may be moved into the first accommodation chamber 11A from the first accommodation chamber 11A side. Thus, such a configuration also provides an operation effect similar to that described above.

Further, the number and the arrangement of electrical as component assemblies 20 described in the embodiments are illustrative and do not place any limit on the configuration.

Further, the embodiments have been described for a case that the electrical component assembly 20 is composed of the coil device for opening and closing the solenoid valves 2 and 3 (see FIG. 1). However, the configuration is not limited to this. That is, the present invention may be applied to a connection structure for a fluid pressure detection sensor (a pressure detecting sensor) and the other electrical components provided in the base 1.

The assembled apparatus to which the electrical component assembly 20 is assembled is not limited to the brake control apparatus 0, and may be another apparatus having electrical components.

What is claimed is:

1. A method for producing a pair of electrically conductive members assembled into an electrical component assembly provided with a coil, the method comprising:
   forming connection terminal sections provided in the pair of electrically conductive members by arranging the connection terminal sections facing each other from a side to side direction and alternately opposite to each other with spacing in an up and down direction as arranged on each of the pair of electrically conductive members, and by performing press punching of a metal plate; and
   after the press punching of the metal plate, bending the connection terminal sections in the pair of electrically conductive members toward a side departing from the coil into a protruding form.

2. The method according to claim 1, further comprising:
   after the bending into the protruding form, as a resin molding step, including by insert molding the bent portions of the connection terminal sections into a terminal supporting section provided in a bobbin around which the coil is wound,
   wherein, by virtue of the resin molding step, the connection terminal sections are formed integrally with the bobbin.

3. The method according to claim 1, wherein the press punching forms extension pieces from a base to be formed into the connection terminal sections.

4. The method according to claim 3, wherein the press punching of the connection terminal sections further forms:
   tapered shape sections to be formed into winding sections;
   first protruding pieces extending transversely to tapered shape sections and to be formed into guide pieces; and
   second protruding pieces extending from the tapered shaped sections and transversely from a base portion, which is to be formed into wire connection sections.

5. The method according to claim 4, wherein:
   the guide pieces and the second protruding pieces extend in the up and down direction and in a transverse direction of a linkage section that connects the electrically conductive members; and
   the extension pieces extend in right and left directions in a longitudinal direction of the linkage section and transversely to the first and second protruding pieces.

6. The method according to claim 5, wherein:
   a first extension piece of the extension pieces extends from a lower side of a center part of the base to be formed into an extending section, toward a second extension piece side of the extension pieces; and
   the second extension piece extends from an upper side of the center part of the base toward the first extension piece side.

7. The method according to claim 6, wherein the first extension piece and the second extension piece are arranged opposite to each other with spacing in the up and down direction and in such a manner that interference with each other is avoided.

8. The method according to claim 7, wherein:
   the bending is performed on the second protruding pieces of the electrically conductive plates and on the extension pieces.

9. The method according to claim 8, wherein:
   the second protruding pieces are bent from a middle part toward the base such as to rise from a surface of the metal plate to a side along on a first bending line, and then bent toward a lower direction of the metal plate such as to face an upper face of the base.

10. The method according to claim 9, wherein the extension pieces protrude at right angles relative to the surface of the metal plate, and the bending is performed on the extension pieces along second bending lines toward a left and a right such as to rise from the surface of the metal plate to a near side of the base.

11. The method according to claim 10, wherein after the bending, at a resin molding step, an insert molding is performed such that bent portions of the extension pieces are formed as resin embedded sections.

12. The method according to claim 11, further compromising integrally forming a bobbin with the bent portions of the extension pieces.

13. The method according to claim 11, further comprising, after the insert molding, separating the electrically conductive members from the linkage section.

* * * * *